United States Patent [19]
Calvert et al.

[11] Patent Number: 5,623,664
[45] Date of Patent: Apr. 22, 1997

[54] INTERACTIVE MEMORY ORGANIZATION SYSTEM AND METHOD THEREFOR

[75] Inventors: Brian E. Calvert; Arthur H. Claus; Robert B. France, all of Austin, Tex.

[73] Assignee: Motorola, Inc., Schaumburg, Ill.

[21] Appl. No.: 279,605

[22] Filed: Jul. 25, 1994

[51] Int. Cl.⁶ ................................................ G06F 9/44
[52] U.S. Cl. ................................................ 395/651
[58] Field of Search .................... 395/700, 650, 395/155, 156, 157, 159, 161

[56] References Cited

U.S. PATENT DOCUMENTS

| | | | |
|---|---|---|---|
| 4,575,816 | 3/1986 | Hendrickson et al. | 395/775 |
| 4,809,219 | 2/1989 | Ashford et al. | 364/900 |
| 4,841,441 | 6/1989 | Nixon et al. | 364/401 |
| 5,134,697 | 7/1992 | Scheffler | 395/497.02 |
| 5,202,996 | 4/1993 | Sugino et al. | 395/700 |
| 5,261,037 | 11/1993 | Tse et al. | 395/76 |
| 5,287,511 | 2/1994 | Robinson et al. | 395/700 |
| 5,311,422 | 5/1994 | Loftin et al. | 364/401 |
| 5,319,645 | 6/1994 | Bassi et al. | 371/19 |

OTHER PUBLICATIONS

Jeff Dorsch, "Mentor Graphics Plts QuickVHDL Price Cuts, Enhancements, Bundles," Electronic News vol. 40, No., 2012, Monday, May 2, 1994, p. 2.

Jim DeTar, "Cypress At Warp3 Speed," Electronic News, vol. 40, No. 2007, Monday, Mar. 28, 1994, pp. 22 and 24.

Primary Examiner—Kevin A. Kriess
Attorney, Agent, or Firm—Elizabeth A. Apperley

[57] ABSTRACT

A method, referred to as the interactive memory mapper or IMM (322), allows a user to program a memory (9) of a data processor (14) using a computer terminal (12) as a visual interface. The IMM allows a user to view and modify a pictorial representation of a data processor's memory space. When the IMM is utilized to allow the plurality of memory blocks to be viewed on the computer terminal, each block has visible attributes corresponding to the memory located at a memory address. Each of the plurality of memory blocks may be selected using a pointing device or keyboard and the blocks' attributes may be modified via an auxiliary controls subroutine (90) of the IMM program. The selected blocks may be created, moved, and resized to either add or subtract additional memory space, but is constrained to legal configurations determined by the specification of the data processor.

25 Claims, 11 Drawing Sheets

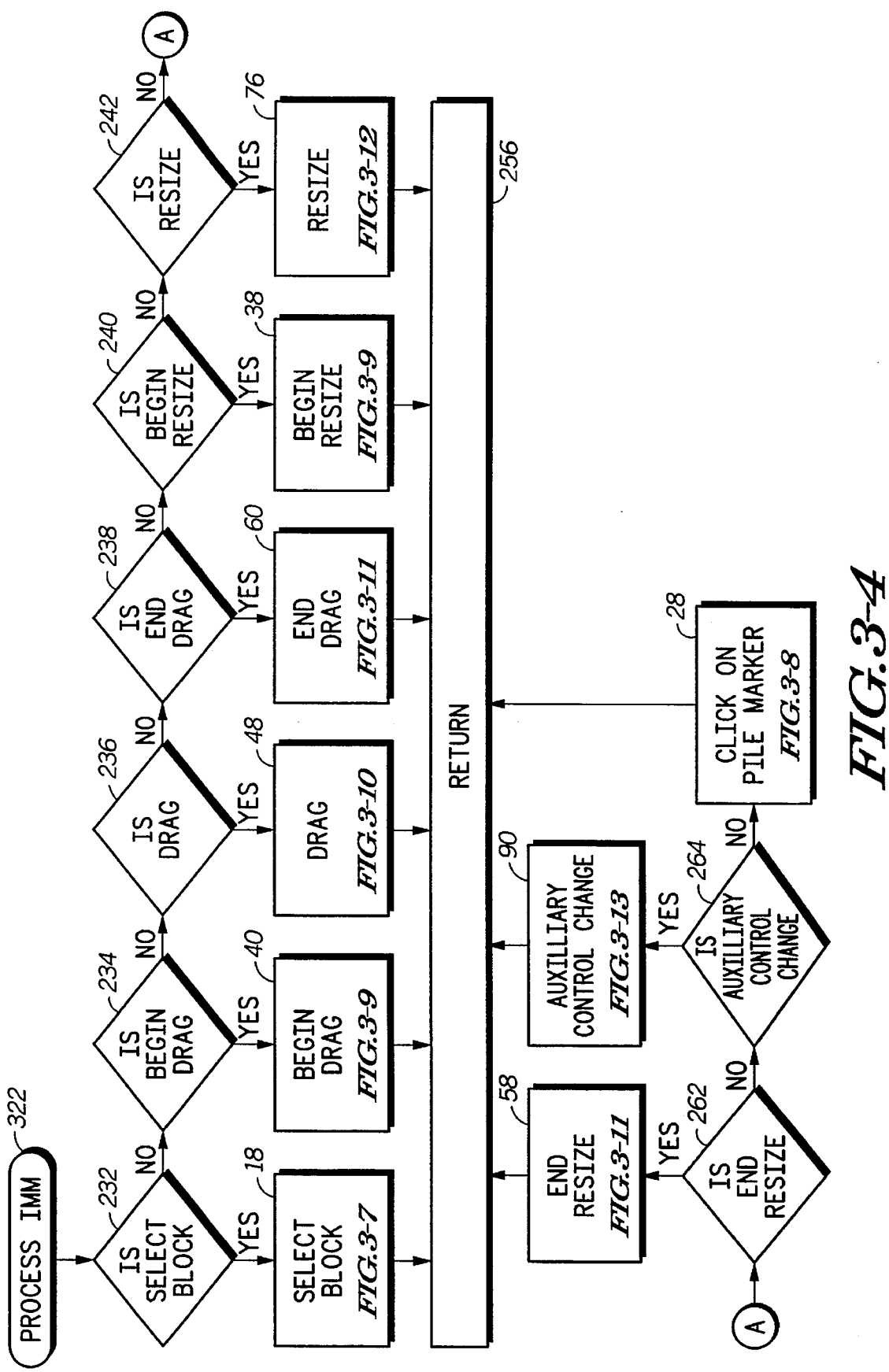

INTERACTIVE MEMORY ORGANIZATION SYSTEM AND METHOD THEREFOR

CROSS REFERENCE TO RELATED APPLICATION

This application is related to our commonly assigned copending patent application Ser. No. 08/279,602 entitled: "A Data Processor Initialization System and Method Therefor" by Robert B. France, Ser. No. 08/279,602 and filed concurrently herewith.

FIELD OF THE INVENTION

This invention relates generally to a programming system, and more particularly to a system for programming memory organization.

BACKGROUND OF THE INVENTION

Microcontrollers have become very complex devices with many different types of on-chip peripherals. Currently, the user of these microcontrollers is required to learn the intricacies of each peripheral as well as the interactions between multiple peripherals before they may use their microcontroller to its best advantage. Some microcontroller initialization processes may require the user to set five hundred or more registers in the microcontroller before the microcontroller may be used. Additionally, the user may have to use five or ten different programming manuals to determine a value to be stored in each of these registers. After determining what values should be stored in all the registers, the registers must be programmed correctly or the microcontroller will not function as expected. Finding errors in the initialization process is often very difficult because the user must refer to the same number of manuals that they initially used to set the values to determine the programming error. In some cases, initialization of a microcontroller may take months and may be a very costly process before the microcontroller is fully functional.

Additionally, current microcontroller implementations have complex memory systems. There are many options for the types of devices that make up the memory spaces. For example, the user must configure on-chip memory blocks, memory-mapped peripheral control registers, and all different types of off-chip memories when programming a single microcontroller. The number of possible configurations can be quite daunting. If the configuration of each of these memory spaces is not correct, the microcontroller will not function correctly. Finding errors in the memory configuration is difficult because the user must again return to the same number of manuals that they initially used to set the values to determine what is wrong. This process is often time consuming. Indeed, the process may take a considerable amount of time for a user to correctly configure a microcontroller to interface with the memory in their design, a feature which is necessary for the operation of the remaining portion of the system.

The trial and error approach required to configure the memory spaces of a microcontroller is made somewhat easier by software programs. For example, ApBuilder is a tool developed by Intel to allow their customers to evaluate, compare, and use on-line reference manuals for Intel 80C186 and 80C196 family microcontrollers in a Microsoft Windows environment. ApBuilder also provides a programming aide for those families of Intel microcontrollers. However, while ApBuilder allows a user to make changes to configuration parameters using a software program, ApBuilder allows a user to modify the functionality of other parameters without informing the user when a change is made. Therefore, this allows the user to create initializations and memory space mappings which won't function correctly. Therefore, the user is required to spend additional time determining where the erroneous change was made and what should be done to correct the error. Furthermore, ApBuilder's memory map portion is non-graphical and this increases the user's difficulty when they have unintentionally overlapped memory regions.

Although ApBuilder attempts to ease the complexity of memory space programming, a need exists for a memory system which efficiently and effectively programs memory in a microcontroller or other data processing system. Currently, solutions to this problem do not provide for a "smart" programming solution in which errors are determined before a user actually tries to use the microcontroller in a system.

SUMMARY OF THE INVENTION

The previously mentioned needs are fulfilled with the present invention. Accordingly, there is provided, a method programming a data processing memory system. The method includes the steps of storing a software program in a memory unit of the data processing memory system and storing a plurality of parameters for modeling a data processor. The plurality of parameters indicate a memory organization of the data processor. A first user input is received for initiating the software program at an interface circuit. The interface circuit is connected to the memory circuit. The first user input is processed by a central processing unit to generate and communicate a plurality of data signals, a plurality of address signals, and a plurality of control signals to the memory circuit. The central processing unit is connected to the interface circuit for communicating the user input and is connected to the memory circuit for communicating the plurality of data signals, the plurality of address signals, and the plurality of control signals. The software program is accessed in the memory unit using the plurality of data signals, the plurality of address signals, and the plurality of control signals. The software provides a first video interface on a terminal of the data processing memory system. The first video interface illustrates a first memory organization of the data processor. A second user input is received for modifying a first portion of the first memory organization of the data processor. The software program is accessed in the memory circuit to determine if the second user input modifying the first portion of the first memory organization results in a first allowable memory configuration of the data processor.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 3-1 illustrates in flow chart form a microcontroller initialization program for the data processing system of FIG. 1;

FIG. 3-2 illustrates in flow chart form an initialization subroutine for the microcontroller initialization program of FIG. 3-1;

FIG. 3-3 illustrates in flow chart form a process user actions subroutine for the microcontroller initialization program of FIG. 3-1;

FIG. 3-4 illustrates in flow chart form an interactive memory mapper program subroutine for the process user actions program subroutine of FIG. 3-3;

FIG. 3-5 illustrates in flow chart form an update system state program subroutine for the register action program subroutine of FIG. 3-3;

FIG. 3-6 illustrates in flow chart form a finish program subroutine for the microcontroller initialization program subroutine of FIG. 3-1;

FIG. 3-7 illustrates in flow chart form a select block program subroutine for the interactive memory mapper program subroutine of FIG. 3-4;

FIG. 3-8 illustrates in flow chart form a click on pile marker program subroutine for the interactive memory mapper program subroutine of FIG. 3-4;

FIG. 3-9 illustrates in flow chart form a begin resize and a begin drag program subroutine for the interactive memory mapper program subroutine of FIG. 3-4;

FIG. 3-10 illustrates in flow chart form a drag program subroutine for the interactive memory mapper program subroutine of FIG. 3-4;

FIG. 3-11 illustrates in flow chart form an end resize and an end drag program subroutine for the interactive memory mapper program subroutine of FIG. 3-4;

FIG. 3-12 illustrates in flow chart form a resize program subroutine for the interactive memory mapper program subroutine of FIG. 3-4;

FIG. 3-13 illustrates in flow chart form an auxiliary control change program subroutine for the interactive memory mapper program subroutine of FIG. 3-4;

FIG. 3-14 illustrates in flow chart form a rule checker execute program subroutine for the update system state program subroutine of FIG. 3-6;

FIG. 3-15 illustrates in flow chart form a check contextual rules program subroutine for the rule checker execute program subroutine of FIG. 3-14;

FIG. 3-16 illustrates in flow chart form a rule checker initialization program subroutine for the general initialization program subroutine of FIG. 3-2;

FIG. 3-17 illustrates in flow chart form a rule checker free program subroutine for the finish program subroutine of FIG. 3-6;

FIG. 4 illustrates a computer screen representation of the interactive memory mapper in accordance with the present invention;

FIG. 5 illustrates a portion of the computer screen representation of FIG. 4 in greater detail;

FIG. 6 illustrates a first plurality of computer screen representations of the interactive memory mapper in accordance with the present invention;

FIG. 7 illustrates a second plurality of computer screen representations of the interactive memory mapper in accordance with the present invention; and FIG. 8 illustrates an alternate embodiment in which the interactive memory mapper and the rule checker programs may be implemented to support object code modules.

DETAILED DESCRIPTION OF A PREFERRED EMBODIMENT

Figure 1:
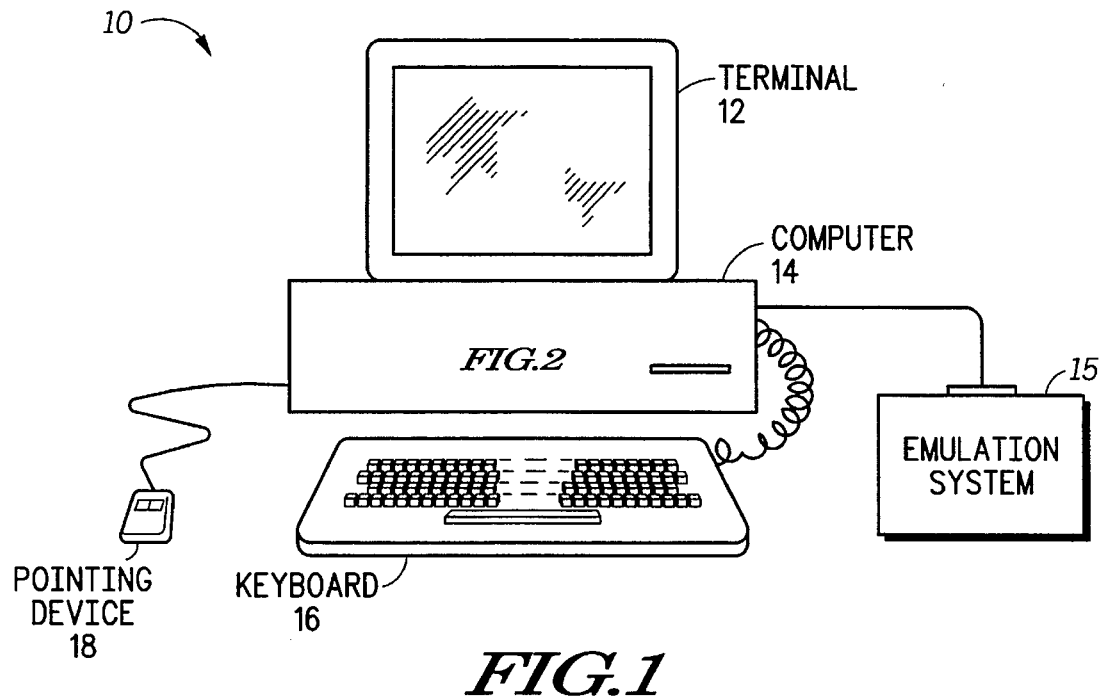
FIG. 1 illustrates in block diagram form a data processing system in accordance with the present invention.

The present invention provides a first software program which allows a person to program a memory space of a microcontroller using a computer terminal as a visual interface. The first software program, referred to as the interactive memory mapper or IMM, allows a user to view and modify a pictorial representation of a microcontroller's memory space. A second software program (Rule Checker) for checking the rules associated with modifying each section of the memory space ensures that a user modifies the parameters of the memory space correctly. Together, these two programs allow a user to easily and efficiently program a microcontroller more quickly and with less possibility of error.

The Interactive Memory Mapper (IMM) was developed to simplify the task of programming a microcontroller's memory space facing all system designers who use microcontrollers and other data processing systems. The IMM allows viewing and editing of a plurality of memory blocks located within the memory map of a microcontroller on a computer terminal. The plurality of device memory blocks may include chip-selected random access memories (RAM) and read only memory (ROM), internal memory modules, and the module register block. When the IMM is utilized to allow the plurality of memory blocks to be viewed on the computer terminal, each block has visible attributes corresponding to the memory located at that memory space. For example, the attributes may include a name, a size, and access rights. Furthermore, in the present implementation, each block's color is keyed to its address space. It should be noted that the color is not required to correspond to an address space, but could also be associated with any attribute of the memory block.

When using the IMM program to configure a data processing system, a pointing device or key on the keyboard may be used to select a block in the memory map. The selected block's attributes may be modified via an auxiliary controls subroutine of the IMM program (the auxiliary controls subroutine will subsequently be discussed in more detail). The selected block can be moved and resized to either add or subtract additional memory space, but is constrained to legal configurations determined by the specification of the microcontroller and enforced by the Rule Checker program previously mentioned. Together, the Rule Checker and IMM programs ensures that the blocks in the memory map cannot be illegally configured. As will be subsequently discussed in more detail, the Auxiliary Control program subroutine provides control information for displaying all of the selected block's attributes. These attributes may be viewed and subsequently modified by the user. The type of attributes displayed may vary with the type of block selected.

The IMM provides a unique interface for configuring the memory space of a microcontroller which provides several advantages. For example, customers are provided with an intuitive way to understand and configure a complicated and error-prone aspect of computer or data processing systems. The IMM reduces the cycle time involved in learning how an unfamiliar data processing system's memory space is organized, in generating code for the initialization of the memory space, and in making poor memory maps more efficient.

For many of the same reasons motivating development of the IMM, the Rule Checker program was also developed. Rule Checker utilizes a functional description of an embedded controller to verify that the operations requested by the user are valid in the current context of the development environment. This helps solve the two problems of increased cycle time and increased number of defects in the code mentioned above. Rule Checker performs each of these functions by checking both physical and contextual rules. Both Rule Checker and the IMM will subsequently be discussed in more detail.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a "$" preceding a value indicates that the value is hexadecimal.

Description of Connectivity

FIG. 1 illustrates a computer system 10 in which the interactive memory mapper (IMM) could be implemented. Computer system 10 generally comprises a terminal 12, a computer 14, an emulation system 15, a keyboard 16, and a pointing device 18. Terminal 12, emulation system 15, keyboard 16, and pointing device 18 are each coupled to computer 14. It should be noted that IMM may be executed a software program stored internally in computer 14 or a software program stored in a computer diskette.

Figure 2:
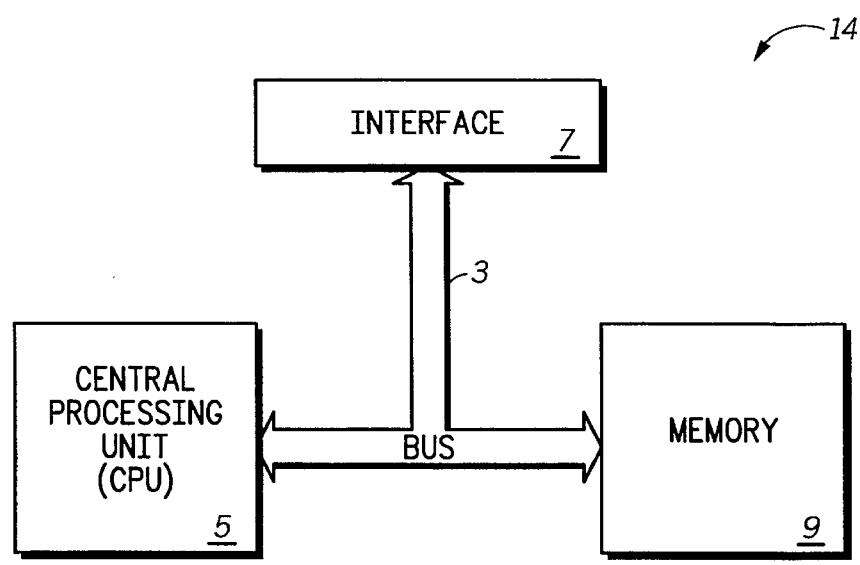
FIG. 2 illustrates in block diagram form a computer of FIG. 1.

FIG. 2 provides illustrates a general form of computer 14 in more detail. Computer 14 includes a central processing unit 5, an interface 7, and a memory 9. Each of central processing unit 5, interface 7, and memory 9 are interconnected via a Bus 3. Bus 3 communicates a plurality of data, address, and control bits.

General Description of Operation

Embedded controllers are becoming increasingly complex. As processes are improved, and new processes are developed, it becomes possible to place ever increasing amounts of functionality on a single integrated circuit. However, along with the increase in functionality, a corresponding increase in complexity occurs. As a result of this increased complexity, developing software for micro-controllers is becoming more and more time consuming and prone to errors.

As previously mentioned, the interactive memory mapper (IMM) was developed to simplify the task of programming a data processing system's memory space facing system designers who use microcontrollers and other data processing systems. Initially, this system is provided to aid in interfacing with a semiconductor manufacturer's products and is part of a software package referred to as "MCUinit." When using this software package, the IMM may either display an existing memory map or specify the arrangement and attributes of a new memory map for which code will be generated.

The IMM assists customers in various positions. In a first group of customers, those new to data processors in general, the IMM leads the neophyte programmer through the process of programming a memory map. Therefore, rather than studying or stumbling over particulars of data processor memory configuration, the new programmers may focus on understanding their programming application. The visually displayed map provides a familiar concept, a memory map, in potentially unfamiliar territory.

In a second group, those new to the semiconductor manufacturer's data processors, the IMM allows the new user to focus on understanding the new data processor, rather than studying or stumbling over any differences between their old and new data processors. Furthermore, at any stage of learning, the IMM minimizes configuration mistakes by providing a "what you see is what you get" interface to the memory configuration. A memory configuration is a source for confusion regardless of the developer's experience level and any mistake in the memory configuration may result in an application which fails unexpectedly or never even begins operating properly. In each of these situations, the IMM may be used to debug the memory map of an actual application.

The IMM allows viewing and editing of a plurality of memory blocks located within the memory map of a data processor on a computer terminal. The plurality of device memory blocks may include chip-selected random access memories (RAM) and read only memory (ROM), internal memory modules, and the module register block. When the IMM is utilized to allow the plurality of memory blocks to be viewed on the computer terminal, each block has visible attributes corresponding to the memory located in that memory space. For example, the attributes may include a name, a size, and access rights. Furthermore, in the present implementation, each block's color is keyed to its address space. It should be noted that the color is not required to correspond to an address space, but could also be associated with any attribute of the memory block.

When using the IMM program to configure a data processor or any type of data processor, a pointing device or key on the keyboard may be used to select a block of memory locations in the memory map. The selected block's attributes may be modified via the previously mentioned auxiliary controls subroutine of the IMM program. The selected block can be moved and resized to either add or subtract additional memory space, but is constrained to legal configurations determined by the specification of the data processor and enforced by the Rule Checker program previously mentioned. The Rule Checker program ensures that the blocks in the memory map cannot be illegally configured. As will be subsequently discussed in more detail, the Auxiliary Control program subroutine provides control information for displaying all of the selected block's attributes. These attributes may be viewed and subsequently modified by the user. The type of attributes displayed may vary with the type of block selected.

The IMM provides a unique interface for configuring the memory space of a data processor which provides several advantages. For example, customers are provided with an intuitive way to understand and configure a complicated and error-prone aspect of computer systems. The IMM reduces the cycle time involved in learning how an unfamiliar data processor's memory space is organized, in generating code for the initialization of the memory map, and in making poor memory maps more efficient.

For many of the same reasons motivating development of the IMM, a Rule Checker program was also developed. Rule Checker utilizes a functional description of an embedded controller to verify that the operations requested by the user are valid in the current context of the development environment. Rule Checker performs each of these functions by checking both physical and contextual rules. Rule Checker was developed as a part of a larger data processing system development environment. Rule Checker verifies that the requested action is valid in the correct context of the environment based on a functional description of the system under development. For the purposes of describing Rule Checker a simple system is described below:

TABLE 1

| Register | Size | Attributes | Rules |
| --- | --- | --- | --- |
| A | 8 Bits | Read Only | None |
| B | 8 Bits | Read/Write | 1. Register A must be read before each time that register B may be written.<br>2. Register B may be read anytime. |

Rule Checker utilizes a functional description of an embedded controller to verify that the operations requested by the user are valid in a current context in which they are used. This verification process aids in solving the two problems mentioned above, increased cycle time and an increased number of defects in the software code. There are two inherent types of rules Rule Checker uses to perform its verification process. A first type of rule is referred to as an attribute. An attribute, or physical rule, is simply a physical limitation on the behavior of a target data processor. An example of an attribute violation would be trying to store a hexadecimal value of $1000 in register A. Because the value would require more than the eight bits of register A, the value of $1000 is too large to be stored in register A and the attempt would generate an error. A second type of rule is a context rule. A context rule is a rule that describes the allowed behavior of a data processor based on the current state of the system. In the sample system described above, Rule 1 for register B is a context rule. An example of a violation of this context rule is illustrated below:

Step 1: Read A

Step 2: Write 3→B

Step 3: Write 4→B

Although both values will fit in B, and B is a writable register, step 3 is illegal because register A was not read between step 2 and step 3. This clearly illustrates the difference in the two types of rules. A context rule is much more complicated than an attribute because the context rule must keep track of not only the physical rules of the data processor, but a current state of the system. For large or complicated systems, such as an embedded controller, it is easy to forget a rule, or not understand the current state correctly. Larger, more complicated systems also require a large amount of time to learn all of the applicable rules. Rule Checker can eliminate these problems, because Rule Checker provides the user with a mechanism that already knows the rules of the data processor and can track a current state of the system.

Furthermore, while this example clearly illustrates the Rule Checker concept, the example does not convey the true usefulness of the product. The sets of rules involved in Rule Checker may often be quite large and very complex. For example, a MC68332, available from Motorola, Inc., includes more than five hundred registers, each of which may be programmed using Rule Checker. In one case, the programming of a single register which determines a base address of a plurality of memory mapped registers affects the value of a plurality of a registers. In addition to large numbers of registers being involved, there are also complex relationships that must be continually examined. For example, a system clock speed for example controls many aspects of data processor operation. The system clock speed affects operations such as baud rates, interrupt timing and power consumption. The relationships between system clock speed, baud rates, interrupt timing, and power consumption are often very difficult, if not impossible, to keep track of manually.

As well, there are obscure requirements regarding procedural issues for several modular components of a data processor. For example, a modular timing system might have several registers which must be written coherently such that the values stored therein are modified as a long word (64 bit) operation in one cycle. Another example of an obscure requirement is related to changing a clock speed of a data processor. Generally, three fields, W, X, and Y, are involved in the process of changing the clock speed. The X field must be programmed differently than fields W and Y and if the X field is programmed improperly, unstable chip operation may result.

IMM and Rule Checker fit together as part of an even larger programming system. The advantages present in this larger programming system over previous systems stem from the basic abilities of each of IMM and Rule Checker. IMM allows the user to easily change memory configurations in a data processor. IMM provides some error handling by eliminating invalid actions, such as dropping a 2K block of a memory on a odd 1K boundary. IMM typically allows a user to easily configure the memory of a data processor while Rule Checker provides the error checking between a remaining portion of the system and the IMM to eliminate errors that might occur outside the scope of the IMM. An example of such an error may be assigning a chip select twice, or placing blocks in the correct areas based on the data processor type or configuration. There are many related areas where the combination of IMM and Rule Checker is useful. Many different types of data processing devices have configurable memories which are difficult and complex to program. Any of these memories will benefit from a graphical software setup tool which provides solid contextual rule checking.

Detailed Description of Operation

During operation of a programming system 10 implementing Rule Checker and IMM and illustrated in FIG. 1, a user of the Rule Checker and IMM software programs may initiate execution of the programs as required by a platform in which the programming system is implemented. The initiation of the software by the user results in the software programs being loaded into a memory of the computer 14. The user will then go about configuring the programming system by entering data using either the pointing device 18 or the keyboard 16. The software programs then display the results of the data entry on the terminal 12. Assuming pointing device 18 is a mouse, the user interacts with the software programs by moving the mouse, pressing the buttons on the mouse, and pressing keys on the keyboard. The software programs may respond by displaying objects which the user has typed, causing actions to happen, and so on, depending on the context of the user's actions. Emulation system 15 is a system of hardware and optional software that can be used in a system (a target) typically containing a data processor as a model of that data processor. Emulation system 15 allows the user to have the ability to monitor any activity that the data processor would see in the target system and provide this data to the host computer system (computer 14 in this example). It should be noted that emulation system 15 provides a hardware model as opposed to a software model of a data processor.

FIG. 2 illustrates a simplified block diagram of the computer 14. Interface 7 is coupled to both pointing device 18 and keyboard 16 to receive the inputs of the user.

Interface 7 decodes and processes the inputs of the user and transfers each to central processing unit 5 and memory 9 via Bus 3. The software programs, Rule Checker and IMM, are both stored in memory 9. Central processing unit 5 accesses and communicates with both memory 9 and interface 7 in a manner well known in the data processing art and, therefore, not explained in detail herein.

Figures 1, 3:
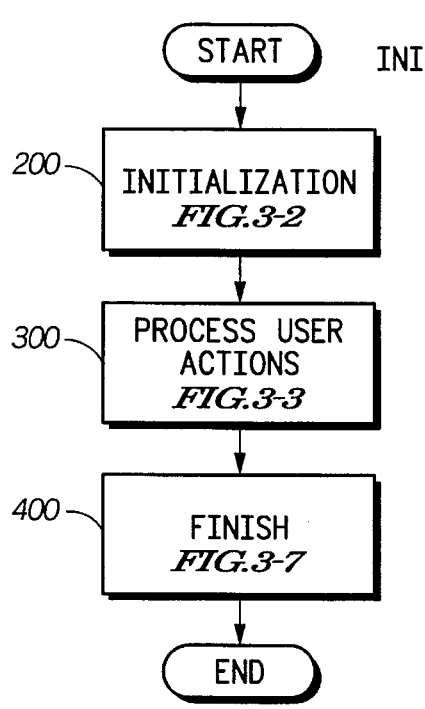
Figures 2, 3:
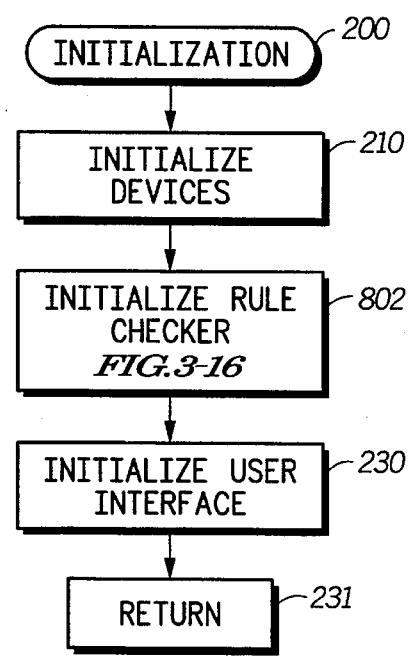
Figure 3:
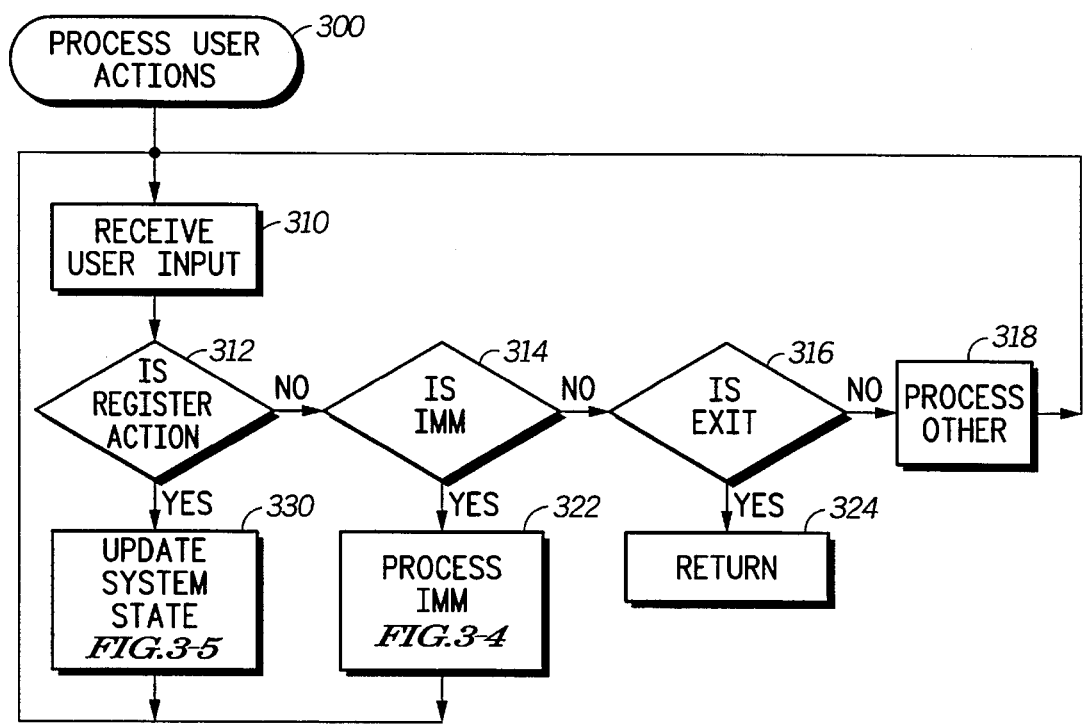

Operation of Rule Checker and Interactive Memory Mapper Software Programs:

FIG. 3-1 describes an overall program flow of the Rule Checker and interactive memory mapper (IMM) software programs in data processing system 10. As previously mentioned, the software programs described herein are stored in memory 9 of computer 14. Furthermore, the following discussion will provide an overview of each of the programming blocks illustrated in FIG. 3-1. A more detailed explanation of each of the programming blocks will be subsequently provided in FIGS. 3-2 through 3-17. It should be noted that in the following flow charts, an oval indicates an initiation or a termination point, a block indicates a step in a corresponding program, and a diamond indicates a decision making step. For ease of understanding, a flow chart describing a flow of the program flow is provided in FIG. 3-1 through FIG. 3-17. Each one of the figures describes operation of a subroutine of a general interactive software program including both the interactive memory mapper software program, also referred to as IMM, and the Rule Checker software program.

Referring to FIG. 3-1, block 200 is an initialization block. During execution of block 200, data describing the data processor the Rule Checker and interactive memory mapper software may model and a model for a default data processor are both read from external files located in memory 9 or a memory (not shown) in emulation system 15. This data is used to create internal data structures used by the Rule Checker and interactive memory mapper software programs to allow a user to modify a model of data processor to be programmed.

Block 300 is a process user actions block. During the execution of block 300, the user configures the model of the data processor to be programmed by the Rule Checker and interactive memory mapper software programs. The software programs create the files necessary to create the configuration on the user's hardware.

Block 400 is a finish block. During the execution of block 400, the software programs will save and close any files which were created for the user and free any system resources used by the software programs' internal data structures.

FIG. 3-2 illustrates block 200, the initialization block, in more detail. Block 200 describes a flow of the software programs' initialization process. Oval 200 titled "Initialization" indicates an entry point in the initialization process.

Block 210 Initialize Devices:

During the execution of block 210, the software programs build the necessary data structures to model the data processors supported by both Rule Checker and interactive memory mapper from data files stored in memory 9.

Block 802 Initialize Rule Checker:

During the execution of block 802, the software programs build the necessary data structures for the Rule Checker to perform its function from data files. Block 802 is illustrated in more detail in FIG. 3-16.

Block 230 Initialize User Interface:

During the execution of block 230, the software programs build the necessary data structures to allow the programs to present all other data to the user from data files stored in memory 9.

Block 231 indicates a termination of the initialization process and a return to the overall program flow illustrated in FIG. 3-1.

FIG. 3-3 illustrates block 300, the process user actions, in more detail. Block 300 describes a general flow of the software programs during execution of various data processing operations. Oval 300 titled "Process User Actions" indicates an entry point in the initialization process.

Block 310 Receive User Input:

During the execution of block 310, a general interactive software program including both the Rule Checker and the interactive memory mapper software will receive user inputs from either keyboard 16 or pointing device 18 of data processing system 10.

Block 312 Is Register Action:

During the execution of block 312, the Rule Checker and interactive memory mapper software determines whether the user inputs provided by keyboard 16 or pointing device 18 were generated by user manipulation of a video display of the modeled parameters of a data processor. If the user input was not generated by manipulating the video display of the modeled parameters of a data processor, then block 330, Update System State, is subsequently executed. If the input was generated by manipulating the video display of the modeled parameters of a data processor, then block 314 is executed.

Block 314 Is IMM:

During the execution of block 314, the general interactive software program then determines if the user input is an action for the interactive memory mapper software system. If the user input is an action for the interactive memory mapper software, block 322 is executed next. Block 322 is described in more detail in FIG. 3-4. If the user input is not an action for the interactive memory mapper software, block 316 is subsequently executed.

Block 316 Is Exit:

During the execution of block 316, the general interactive software program determines if the user input is a request to exit the Rule Checker and interactive memory mapper software programs. If the user input is a request to exit the software programs, return block 324 is executed. If not, block 318 is subsequently executed.

Block 318 Process Other:

Block 318 is executed when the user input was not a register action, an action for the interactive memory mapper, or a request to exit the software. During execution of block 318 all other user inputs are handled. Such user inputs may include saving output files or changing a device being modeled.

Block 330 Update System State:

Block 330 is executed if the user input is a register action. During the execution of block 330, the general interactive software program processes any user requests to update a state of the microprocessor model which does not involve the interactive memory mapper. This is only true for the function performed for FIG. 3-3. In other portions of the flowchart for the general software program described herein, the general interactive software program will process any user requests to update a state of the microprocessor model which does involve the interactive memory mapper.

Block 322 Process IMM:

Block 322 is executed if the user input is an action to be executed by the interactive memory mapper software program. During the execution of block 322, the general interactive software program processes the request to change the memory map modeled by the interactive memory mapper software based on the data processor model.

Block 324 Return:

Block 324 is executed if the user input is a request to exit the software. The execution of block 324 causes the general interactive software program to continue into block 400.

Figures 3, 4, 5:
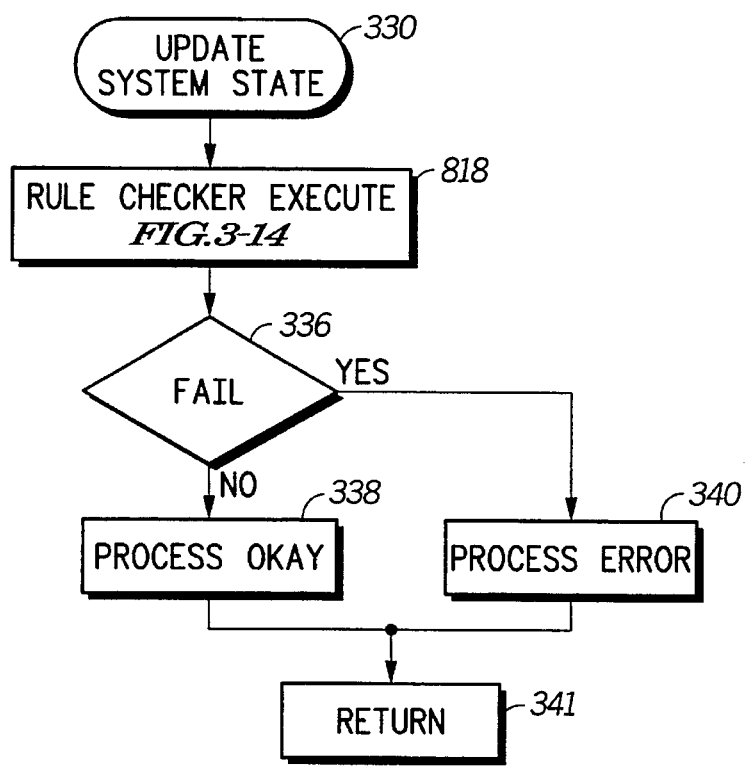
Figures 3, 4, 5, 6:
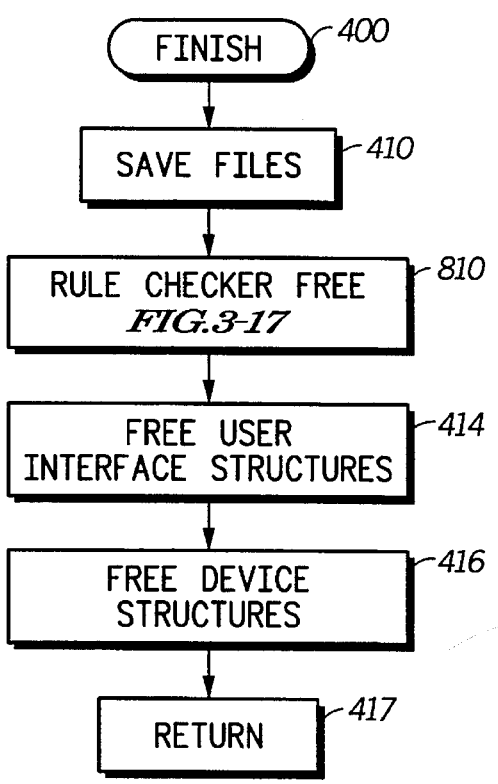

FIG. 3-4 illustrates block 322, the IMM (interactive memory mapper), in more detail. Block 322 describes a general flow of the IMM software program. Oval 322 titled "Process IMM" indicates an entry point in the programming flow of the interactive memory mapper software program.

Block 232 Is Select Block:

During execution of block 232, the interactive memory mapper software determines if the user input is a request to select a block of memory included in the memory modeled by the interactive memory mapper. If the user input is a request to select the block of memory, block 18 is executed. If the user input is not a request to select the block of memory, block 234 is executed.

Block 234 Is Begin Drag:

During the execution of block 234, the interactive memory mapper software determines if the user input is a request to start dragging a block of memory in the interactive memory mapper. If the user input is a request to start dragging the block of memory, block 40 is executed. If the user input is not a request to start dragging the block of memory, block 236 is executed. It should be noted that "dragging" refers to a user action to move a memory block.

Block 236 Is Drag:

During execution of block 236, the interactive memory mapper software determines if the user input is a request to continue dragging a block of memory in the interactive memory mapper. If the user input is a request to continue dragging the block of memory, block 48 is executed. If the user input is not a request to continue dragging the block of memory, block 238 is executed.

Block 238 Is Drag End:

During execution of block 238, the interactive memory mapper software determines if the user action is a request to end the dragging of a block of memory in the interactive memory mapper. If the user input is a request to end dragging the block of memory, block 60 is executed. If the user input is not a request to end dragging the block of memory, block 240 is executed.

Block 240 Is Begin Resize:

During execution of block 240, the interactive memory mapper software determines if the user input is a request to start to resize a block of memory in the interactive memory mapper. If the user input is a request to resize the block of memory, block 38 is executed. If the user input is not a request to resize the block of memory, block 242 is executed.

Block 242 Is Resize:

During execution of block 242, the interactive memory mapper software determines if the user input is a request to continue resizing a block of memory in the interactive memory mapper. If the user input is a request to continue resizing the block of memory, block 76 is executed. If the user input is not a request to continue resizing the block of memory, block 262 is executed.

Block 262 Is End Resize:

During the execution of block 262, the interactive memory mapper software determines if the user action is a request to end the resizing of a block of memory in the interactive memory mapper. If the user input is a request to end the resizing of the block of memory, block 58 is executed. If the user input is not a request to end the resizing of the block of memory, block 264 is executed.

Block 264 Is Auxiliary Control Change:

During the execution of block 264, the interactive memory mapper software determines if the user input is a request to change any of the auxiliary control items. If the user input is a request to change any of the auxiliary control items, block 90 is executed. If the user input is not a request to change any of the auxiliary control items, block 28 is executed.

Block 18 Select Block:

Block 18 is executed when the user input is a request to select a block in the in the IMM. During execution of this block, the interactive memory mapper software performs the action necessary to update the display of the interactive memory mapper to indicate that a memory block has been selected. Block 18 is illustrated in greater detail in FIG. 3-7.

Block 40 Begin Drag:

Block 40 is executed when the user input is a request to start dragging a block of memory visually displayed on terminal 12 of data processing system 10 during execution of the Interactive memory mapper software program. During execution of this block, the Interactive memory mapper software performs the necessary action to update the display of the interactive memory mapper to indicate that a memory block is being dragged. Block 40 is illustrated in greater detail in FIG. 3-9.

Block 48 Drag:

Block 48 is executed when the user input is a request to continue dragging a memory block visually displayed on terminal 12 of data processing system 10 during execution of the interactive memory mapper software program. During execution of this block, the interactive memory mapper software performs the necessary action to update the display of the interactive memory mapper to indicate that a memory block has moved. Block 48 is illustrated in greater detail in FIG. 3-10.

Block 60 End Drag:

Block 60 is executed when the user input is a request to end dragging a memory block visually displayed on terminal 12 of data processing system 10 during execution of the interactive memory mapper software program. During execution of this block, the interactive memory mapper software performs the necessary action to update the display of the interactive memory mapper to indicate that a memory block is finished moving. Block 60 is illustrated in greater detail in FIG. 3-11.

Block 38 Resize Block:

Block 38 is executed when the user input is a request to start execution of this block; the interactive memory mapper software performs the necessary action to update the display provided on terminal 12 in response to the interactive memory mapper software to indicate that a memory block is going to be resized. Block 38 is illustrated in greater detail in FIG. 3-9.

Block 76 Resize:

Block 76 is executed when the user input is a request to continue resizing a memory block using the interactive memory mapper program. During execution of this block, the interactive memory mapper software performs the necessary action to update the video display of terminal 12 in response to the interactive memory mapper software to indicate that a memory block has changed size. Block 76 is illustrated in greater detail in FIG. 3-12.

Block 58 End Resize:

Block 58 is executed when the user input is a request to end resizing a memory block in the memory map of the modeled data processor. During execution of this block, the interactive memory mapper software performs the necessary action to update the information displayed on terminal 12 in response to the interactive memory mapper to indicate that a memory block has been resized. Block 58 is illustrated in greater detail in FIG. 3-11.

Block 90 Auxiliary Control Change:

Block 90 is executed when the user input is a request to change one of the auxiliary controls in the interactive memory mapper. During execution of this block, the interactive memory mapper software performs the necessary action to update the display of terminal 12 in response to the interactive memory mapper software to indicate that an auxiliary control has changed. Block 90 is illustrated in greater detail in FIG. 3-13. The auxiliary controls include the attributes of the modeled data processor. During execution of the general interactive software program, the attributes of the modeled data processor may be viewed and selectively set by the user of the interactive memory mapper system. The type of attributes displayed may vary with the type of block selected. For example, the attributes may include size, address, and bit length.

Block 28 Process Click On Pile Marker:

Block 28 is executed when the user input is a click on a pile marker illustrated in the video display of terminal. 12 of data processing system 10. During execution of this block, the interactive memory mapper software updates the display to move the next block of memory in the pile to the top in the interactive memory mapper. Block 28 is illustrated in greater detail in FIG. 3-8.

Block 256 Return:

Block 256 is executed when the software is finished processing a request to the interactive memory mapper. Entry into block 256 will cause the software to continue its flow to block 310.

FIG. 3-5 illustrates block 330, the Update System State block, in more detail. Block 330 describes a specific portion of the software program initially illustrated in general detail in FIG. 3-6. Oval 330 titled "Update System State" indicates an entry point in the programming flow of the interactive memory mapper software program.

Block 818 Rule Checker Execute:

During the execution of block 818, the request to change the state of the data processor model stored in memory 9 is checked to verify that the modification will not result in conflicts with existing characteristics of the data processor. Block 818 is illustrated in greater detail in FIG. 3-14 and will be subsequently discussed in greater detail.

Block 336 Fail:

During execution of block 336, the interactive memory mapper software determines if the Rule Checker execute section of the program code has executed successfully. If the program flow has returned, block 340 is executed. If the program flow has not returned, block 338 is executed.

Block 338 Process Okay:

This block is executed when the Rule Checker software program has found no conflicts between the change request and the current state of the data processor model. During execution of this block, the general interactive software program will make the necessary updates to the state of the data processor model to process the request.

Block 340 Process Error:

Block 340 is executed when the Rule Checker software program has found conflicts between the current system state and the user change request. During execution of this block, the general interactive software program informs the user what the conflict was via terminal 12 of data processing system 12. Subsequently, the user is allowed to take the appropriate action to correct the error.

Block 341 Return:

Execution of block 341 causes the software to continue its flow to block 310.

FIG. 3-6 illustrates block 400, the Finish block, in more detail. Block 400 describes a specific portion of the general interactive software program initially illustrated in general detail in FIG. 3-1. Oval 400 titled "Finish" indicates an entry point in the programming flow of the general interactive software program which includes both the interactive memory mapper software and Rule Checker software.

Block 410 Save Files:

During execution of this block, the general interactive software program saves any output generated by the user to the appropriate files in memory 9. These files may include, but not be limited to, source code for the user to use to initialize their design and changes to any of the data files the software uses for its modeling purposes.

Block 810 Rule Checker Free:

During execution of block 810, the general interactive software program returns any resources used during execution of the Rule Checker program to the data processing system 10. Block 810 is illustrated in FIG. 3-17 and will be subsequently discussed in more detail.

Block 414 Free User Interface Structures:

During execution of this block, the interactive memory mapper software will return any resources used to interact with the user to data processing system 10.

Block 416 Free Device Structures:

During execution of block 416, the interactive memory mapper software returns any resources used to model the supported data processors and microcontrollers to data processing system 10.

Block 417 Return:

The execution of block 417 causes the software to end execution of the general interactive software program including the interactive memory mapper and Rule Checker programs.

FIG. 3-7 illustrates block 18, the Select block, in more detail. Block 400 describes a specific portion of the software program initially illustrated in general detail in FIG. 3-4. Oval 18 titled "Select Block" indicates an entry point in the programming flow of the interactive memory mapper software program.

Block 20 Select IMM Block:

During execution of block 20, the interactive memory mapper software updates a selected memory block's data structure to indicate that the memory block is selected. Any previously selected memory block's data structure is updated to indicate that it is no longer selected.

Block 22 Update Auxiliary Controls:

During execution of block 22, the interactive memory mapper software updates the auxiliary controls using information from a newly selected memory block. Execution of this block may, but does not necessarily, modify the auxiliary controls based on the memory block type.

Block 24 Redraw Block:

During execution of block 24, the interactive memory mapper software redraws the previously selected memory block as a normal memory block and redraws the newly selected memory block as a selected memory block. The redrawn blocks are displayed to the user via the video display of terminal 12.

Block 26 Return:

Block 26 is executed when the Select Block routine is finished. It returns control to block 232 following the redraw block.

FIG. 3-8 illustrates block 28, the Click On Pile Marker block, in more detail. Block 28 describes a specific portion of the software program initially illustrated in general detail in FIG. 3-4. Oval 28 titled "Click On Pile Marker" indicates an entry point in the programming flow of the interactive memory mapper software program.

Block 30 Move Top Pile Block To Bottom:

During the execution of this block, the interactive memory mapper software moves a top memory block in a pile on the visual display of terminal 12 to the bottom of the pile. This results in no change to the memory block data structure, only in the way that it is displayed to the user of data processing system 10 via terminal 12.

Block 32 Update Pile Marker:

During the execution of this block, the interactive memory mapper software updates a size of the pile marker to match a size of a top memory block in the pile.

Block 34 Redraw Pile:

During the execution of this block, the interactive memory mapper software redraws the pile marker and the pile's memory blocks to reflect their new arrangement to the user of data processing system 10 via terminal 12.

Block 36 Return:

This block is executed when the Click On Pile Marker routine is finished. It returns control to block 256 of FIG. 3-4.

FIG. 3-9 illustrates block 38, the Begin Resize block, and block 40, the Begin Drag block, in more detail. Blocks 38 and 40 describe a specific portion of the software program initially illustrated in general detail in FIG. 3-4. Oval 38 titled "Begin Resize" indicates a first entry point in the programming flow and oval 40 titled "Begin Drag" indicates a second entry point in the programming flow of the interactive memory mapper software program.

Block 42 Initialize Block Information:

During the execution of block 42, the interactive memory mapper software initializes a copy of a selected memory block's information and an initial pointing device position. This copy is used during a drag/resize operation and, at after the drag/resize operation, to determine whether the drag/resize operation caused any changes to the block of memory.

Block 44 Redraw Block Outline:

During the execution of this block, the interactive memory mapper software draws an outline of the memory block on the video display of terminal 12 as it is offset by the drag/resize operation.

Block 46 Return:

Block 46 is executed when the Begin Resize or Begin Drag routine is finished. Block 46 returns control to block 256 of FIG. 3-4.

FIG. 3-10 illustrates block 48, the Drag block, in more detail. Block 48 describes a specific portion of the software program initially illustrated in general detail in FIG. 3-4. Oval 48 titled "Drag" indicates an entry point in the programming flow of the interactive memory mapper software program.

Block 50 Update Block Location:

During execution of block 50, the interactive memory mapper software updates the copy of the memory block's information. New information may include, but is not necessarily limited to, a memory block base address.

Block 52 Constrain Block to Closest Legal Values:

During execution of block 52, the interactive memory mapper software adjusts the values of the copy of the memory block to the nearest legal values. Values to be constrained include, but are not limited to, memory block base address and alignment addresses.

Block 54 Redraw Block Outline:

During execution of block 54, the interactive memory mapper software draws an outline of the memory block displayed on terminal 12 as it is offset by a drag operation.

Block 56 Return:

Block 56 is executed when the Drag routine is finished. Block 56 returns control to block 256 of FIG. 3-4.

FIG. 3-11 illustrates block 58, the End Resize block, and block 60, the End Drag block, in more detail. Blocks 58 and 60 describe a specific portion of the software program initially illustrated in general detail in FIG. 3-4. Oval 58 titled "End Resize" indicates a first entry point in the programming flow and oval 60 titled "End Drag" indicates a second entry point in the programming flow of the interactive memory mapper software program.

Block 62 Change?:

During execution of block 62, the interactive memory mapper software compares the initial memory block information to the final position to determine whether the drag/resize operation caused any changes to the memory block. If no changes have occurred to the memory block, block 74 is executed. If a change has occurred to the memory block, block 330 is executed.

Block 330 Update System State:

Block 330 is only executed when the memory block has changed position or size. During the execution of this block, the software updates the system state based on the copy of the memory block's information and performs a rules checking operation using the Rule Checker. Block 330 is illustrated in FIG. 3-5 and was previously discussed in greater detail.

Block 66 Error?:

During execution of block 66, the interactive memory mapper software checks for an error state from the previous call to block 330. If an error occurred, block 74 is executed. If an error has not occurred, block 68 is executed.

Block 68 Update IMM Attributes:

During execution of block 68, the interactive memory mapper software updates the interactive memory mapper data structure attributes of the memory block to reflect its new state. The new state may, but is not required to, include a new address or size.

Block 70 Update Auxiliary Controls:

During execution of block 70, the interactive memory mapper software updates the auxiliary controls using information from the newly modified memory block. This step may, but does not necessarily, modify the controls based on the memory block type.

Block 72 Redraw IMM:

During execution of block 72, the interactive memory mapper software redraws all of the elements of the interactive memory mapper on the video display of terminal 12 to interact with a user of data processing system 10. Execution of this block is necessary to ensure that no changes due to the drag/resize operation are missed.

Block 74 Return:

Block 74 is executed when the End Resize or End Drag routine is finished. Block 74 returns control to block 256 of FIG. 3-4.

FIG. 3-12 illustrates block 76, the Resize block, in more detail. Block 76 describes a specific portion of the software program initially illustrated in general detail in FIG. 2-4. Oval 76 titled "Resize" indicates an entry point in the programming flow of the interactive memory mapper software program.

Block 78 Update Block Dimensions:

During execution of block 78, the interactive memory mapper software adjusts the values of the copy of the memory block previously stored to reflect the resizing performed by the user thus far. Values which may be adjusted include, but are not necessarily limited to, memory block size and width.

Block 84 Constrain Block To Closest Legal Values:

During execution of block 84, the interactive memory mapper software adjusts the values of the copy of the memory block previously stored in memory 9 to the nearest legal values allowed by the model of the data processor being emulated. Values which may be constrained include, but are not limited to, memory block base address and alignment.

Block 86 Redraw Block Outline:

During execution of block 86, the interactive memory mapper software draws an outline of the memory block on the video display of terminal 12 after being adjusted by the resize operation.

Block 88 Return:

Block 88 is executed when the Resize routine is finished. Execution of block 88 returns control to block 256 of FIG. 3-4.

FIG. 3-13 illustrates block 90, the Auxiliary Control Change block, in more detail. Block 90 describes a specific portion of the software program initially illustrated in general detail in FIG. 3-4. Oval 90 titled "Auxiliary Control Change" indicates an entry point in the programming flow of the interactive memory mapper software program.

Block 92 New Selected Block?:

During the execution of this block, the interactive memory mapper software determines whether a block menu in a section of program code controlling auxiliary controls used to select a new memory block. If no changes have occurred, a program control flow transfers to block 330, the Update System State block previously described in FIG. 3-5. If changes do occur, then the program control flow continues on to block 94.

Block 94 Select IMM Block:

During execution of block 94, the interactive memory mapper software updates the interactive memory mapper by selecting the memory block chosen by the auxiliary controls' block menu. The previously selected block is redrawn as a normal block and the newly selected block is redrawn as a selected block on the video display of terminal 12 of data processing system 10.

Block 96 Update Auxiliary Controls:

During the execution of this block, the interactive memory mapper software updates the auxiliary controls using information from the newly selected memory block. This step may, but does not necessarily, modify the controls based on the memory block type.

Block 330 Update System State:

This block is only executed if the memory block has changed position. During the execution of this block, the interactive memory mapper software updates the system state based on the copy of the memory block's information and performs a rules checking operation. Block 330 was previously described in reference to FIG. 3-5.

Block 98 Update IMM Attributes:

During execution of block 98, the interactive memory mapper software updates the interactive memory mapper data structure attributes of the memory block to reflect its new state. The new state may, but does not have to, include a new address, size, or any other attribute of the memory block.

Block 100 Redraw IMM:

During execution of block 100, the interactive memory mapper software redraws all of the elements of the interactive memory mapper. This is necessary to ensure that no changes due to the auxiliary controls are missed. For example, execution of block 100 ensures that newly selected blocks are moved to the top of any piles and that newly changed attributes are displayed correctly in the complete memory map.

Block 102 Return:

This block is executed when the Auxiliary Control Change routine is finished. Execution of block 102 returns control to block 256 of FIG. 3-4.

FIG. 3-14 illustrates block 818, the Rule Checker Execute block, in more detail. Block 818 describes a specific portion of the Rule Checker software program initially illustrated in general detail in FIG. 3-5. Oval 818 titled "Rule Checker Execute" indicates an entry point in the programming flow of the Rule Checker software program.

Block 820 Check Physical Rules:

During execution of block 820, the Rule Checker software program will check all of the physical rules corresponding to the model data processor for a requested action. Physical rules include size, sign, alignment, and attribute (e.g.. read only, write only). Physical rules basically incorporate all of the rules that must be followed because the physical construction of the model data processor won't allow any other behavior.

Block 828 Violation of Physical Rule:

During execution of Block 828, the results generated during the Check Physical Rules routine are analyzed to determine if any of the model data processor rules were violated. If any rule of the model data processor was violated, block 836 is executed. If no rules of the model data processor are violated, block 838 is executed.

Block 838 Check Contextual Rules:

During execution of block 838, the Rule Checker software program will check all of the contextual rules corresponding to the model data processor for a requested action. Contextual rules include those rules which are imposed by a current configuration of the data processor to be modeled. An example of such a contextual rule is that a pin which is being used as a chip select can not also be used for general purpose input and output. Another example of such a rule is that a data processor with a 32 KHz system clock frequency can't produce a serial data rate of 10 Mbps. These examples merely indicate two of the many contextual rules used in every data processor. Block 838 will be subsequently described in more detail and is illustrated in FIG. 3-15.

Block 832 Violation of Contextual Rule:

During execution of Block 832, the results generated during the Check Contextual Rules routine are analyzed to determine if any of the model data processor contextual rules were violated. If any contextual rule of the model data processor was violated, block 836 is executed. If no rules of the model data processor are violated, block 834 is executed.

Block 834 Return Okay:

Block 834 is reached and executed only if all physical and contextual rules were valid and were successfully passed in blocks 820 and 838. When block 834 is accessed, control of the program flow is returned to block 336 of FIG. 3-5 with a status value of Okay to indicate that there were no rule violations.

Block 836 Return Error:

This block is reached if either a physical or a contextual rule failed. If block 836 is accessed, control of the program flow is returned to block 336 of FIG. 3-5 with a status value of Error to indicate that a rule has been violated. Additionally, depending on a data processing system in which the Rule Checker software program has been incorporated, data processing information regarding the erroneous rule and a possible solution for correcting the erroneous rule may also be supplied.

FIG. 3-15 illustrates block 838, the Check Contextual Rules block, in more detail. Block 838 describes a specific portion of the software program initially illustrated in general detail in FIG. 3-14. Oval 838 titled "Check Contextual Rules" indicates an entry point in the programming flow of the Rule Checker software program.

Block 840 Check Self:

During execution of block 840, all contextual rules corresponding to a current element being set or modified are verified and inspected for errors.

Block 842 Violation:

During execution of block 842, the results generated during the Check Self routine are viewed to determine if rules relating to a current element being tested were violated. If any rule of the model data processor was violated, block 850 is executed. If no rules of the model data processor are violated, block 844 is executed.

Block 844 Check Children:

During execution of block 844, all rules for all children are tested. A child is the dependent half of a relationship and a parent is the half of the relationship which is depended upon. As each node representing a "child" is tested, the node is identified such that each node is only checked once.

Block 846 Violation:

During execution of block 846, the results generated during the Check Children routine are viewed to determine if any rules corresponding to the children were violated. If any such rule was violated, block 850 is executed. If no rules are violated, block 848 is executed.

Block 848 Return Okay:

Block 848 is reached and executed only if all rules in both the current element and its children were valid and were successfully tested in blocks 840 and 844. When block 848 is accessed, control of the program flow is returned to block 832 with a status value of Okay indicating that no rules were violated.

Block 850 Return Error:

This block is reached if a rule failed. If block 850 is accessed, control of the program flow is returned to block 832 with a status value of Error indicating that a rule was violated. Additionally, depending on a data processing system in which the Rule Checker software program has been incorporated, data processing information regarding the erroneous rule and a possible solution for correcting the erroneous rule may also be supplied.

FIG. 3-16 illustrates block 803, the Rule Checker Initialization block, in more detail. Block 803 describes a specific portion of the software program initially illustrated in general detail in FIG. 2-2. Oval 803 titled "Rule Checker Initialization" indicates an entry point in the programming flow of the Rule Checker software program.

Block 804 Convert External Dependency Files Into Internal Structures:

Rule Checker relies on external data to implement the knowledge base used to determine which physical rules apply, limits, dependency types and so on. During execution of block 804, these files are read in from an external storage source (not shown herein) and converted into the internal structures in memory 9 that the Rule Checker software program requires.

Block 806 Return:

When block 806 is accessed, control of the program flow is returned to block 230 of FIG. 3-2.

FIG. 3-17 illustrates block 810, the Rule Checker Free block, in more detail. Block 810 describes a specific portion of the software program initially illustrated in general detail in FIG. 3-6. Oval 811 titled "Rule Checker Free" indicates an entry point in the programming flow of the Rule Checker software program.

Block 812 Destroy Internal Data Structures:

When the user has finished and the system is exiting, the Rule Checker software program must release the system resources it has allocated to store information required to model a data processor. When Block 812 is accessed, the memory used to store this information is cleared so that the memory may be used for another purpose.

Block 814 Return:

When block 814 is accessed, control of the program flow is returned to block 414 of FIG. 3-6.

Description of User Interface for the Interactive memory mapper

FIG. 5 is an overview of an Interactive memory mapper video display 510 and a corresponding Auxiliary Controls video display 500. The Interactive memory mapper (IMM) 500 allows viewing and editing of a plurality of device memory blocks 534. The plurality of device memory blocks 534 may be chip-selected RAM (random access memory) and ROM (read only memory), an internal memory module, or a module register block. The IMM display 510 represents a valid range of memory addresses for a data processing device to be modeled and emulated during the programming process. A plurality of addresses are listed on the side of the IMM display 510 from a low value to a high value ($0000 through $3000). A total memory area is divided in half. In the total memory area, even addresses are visually placed on the left and odd addresses are visually placed on the right. Blocks are placed in the IMM display 510 according to a base address; block length is sized to scale; and block width is sized for a bit width of the memory blocks. Assume that for the present application, the bit width of the memory blocks is eight or sixteen bits. Eight-bit blocks are positioned horizontally according to whether they cover the odd or even bytes. Each block has visible attributes printed on it (for example, name (542), size (544), and access rights (546)). Furthermore, in the present implementation of the invention, each block's color is keyed to its address space (red is CPU, yellow is supervisor mode, green is user mode, white is both supervisor and user modes).

Clicking on a block in the IMM display 510 selects that block and the attributes corresponding to that block are displayed on the Auxiliary Controls display 500. The selected block's attributes may be modified via the auxiliary controls. In one implementation of the present invention, the selected block can be moved by using a mouse. Holding down the mouse button while the cursor is over the block and moving the mouse moves the block in that direction. It should be noted that the block is constrained and will move only to legal locations which are defined by the contextual rules of the modeled data processor. A block may be moved to a new base address by dragging it to the new location and releasing the mouse button. Likewise, an eight-bit block can be moved horizontally to cover odd or even bytes.

Additionally, the selected block can be resized. Four "handles" 550 appear in the corners of a selected block. Holding down the mouse button while the cursor is over a handle and moving the mouse resizes the block in that direction. Again, the length or width of a block is constrained to legal values which are defined by the contextual rules of the modeled data processor.

Blocks may also overlap one another. If two or more blocks overlap, a "pile marker" 548 will appear in the margin next to the blocks. Clicking on the pile marker moves the top block to the bottom of the pile, allowing access to the next block down. Multiple levels may exist and may all be accessed by clicking on the pile marker.

The Auxiliary Controls display 500 displays all of the currently selected block's attributes. During execution of the interactive memory mapper and Rule Checker programs, the attributes may be viewed and selectively set by the user of the interactive memory mapper system. The type of attributes displayed may vary with the type of block selected. For example, chip select memories may have all the attributes illustrated in FIG. 5 while a block of on-chip memory may only have attributes defining its base address and size.

In addition to attributes visibly depicted in the IMM display 510, the Auxiliary Controls display 500 illustrates special attributes that vary by a type of block which is accessed. In this example of the invention, there are a number of controls which are general in nature and others which are more specific. For example, the Block option menu 512 allows the user to view the name of the currently selected memory block and select a new memory block, the Base Address text field 514 allows the user to view and set the base address by typing in a new value, and the Size option menu 516 allows the user to view and set the assumed size of the block. Additionally, the block's access mode 518, the byte or bytes covered by the block 520, block access rights 522, the chip select's strobe signal 524, the number of wait states to assume before receiving data 526, the block's address space 528, the interrupt priority of the block 530, and source of the interrupt vector 532 are also displayed.

The Auxiliary Controls display 500 and IMM display 510 interact. For example, a currently selected block is tied to the block option menu. Changing the block in the block option menu selects a new block in the IMM display 510. Likewise, clicking to select a block in the IMM display 510 updates the block option menu. In either case, the other auxiliary controls update to show the selected block's state.

Example of Operation

An example will serve best to explain how the Rule Checker portion of the interactive memory mapper software program functions and the terms associated with this functionality. Note that not all relationships are described in full detail; rather, only enough breadth and depth of information is provided to allow an explanation of the principals and functions present in the Rule Checker software program.

The following example uses the relationship between a data processing system clock speed, a baud rate of one of a plurality of synchronous serial channels, and a duration of a timer used to generate interrupts. The system clock speed is a rate at which a central processing unit of a data processor operates. The system clock speed is controlled by four different elements including a reference frequency which is usually determined by a crystal and three fields (W, X, and Y) in a synchronization register (SYNCR). These four elements collectively represent a CLOCK value in the present example. The baud rate is a speed at which information is transferred via the synchronous serial link. The baud rate depends on both the CLOCK value and a value of a baud divisor (SCBR) for determining a rate at which bits are transferred and which is located in a register. CLOCK and the value of the field SCBR are collectively referred to as BAUD. The interrupt rate is a speed at which a timer sends an interrupt to the central processing unit. The interrupt rate is determined by the CLOCK value, a prescale field in a register for determining a rate of periodic interrupts, which determines whether a clock prescaler value is equal to either the CLOCK value or a divided CLOCK value, and a timer modulus number. Taken together, the CLOCK value, the PTP field of the PITR, and the timer modulus number is referred to as a PIT. Operation of the PIT includes the steps of loading a number into timer modulus number, decrementing the number by one every 1 or 512 clock cycles based on the value held in the PTP bit and generating an interrupt when the timer modulus number is equal to zero.

In this example, three values have been defined: CLOCK, BAUD and PIT. The CLOCK value does not rely on either of the other two elements. However, the other two values, BAUD and PIT, both rely on the value of CLOCK to determine their functionality. Based on this relationship, CLOCK is considered a parent of both BAUD and PIT. Correspondingly BAUD and PIT are both children of CLOCK. The relationship between BAUD and PIT is sibling, that is they share a parent.

In a following scenario, an engineer engaged in a tradeoff between clock speed and the needed baud rate. It should be noted that the lower clock speeds correspond to lower power consumption. It should also be noted that the clock speed must be high enough to support the needed baud rate. With this background information, consider the following explanation of FIGS. 7 and 8 which illustrate one possible interaction with the decisions and limitations posed by the Rule Checker software program. It is important to note that the form itself is of no consequence and that the key point is the information conveyed from Rule Checker software program indicating that a conflict has occurred.

Figures 3, 4, 5, 6, 7:
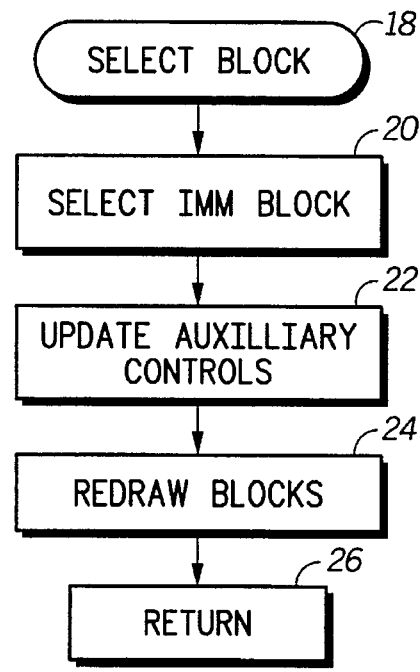

FIG. 7 illustrates three dialogues, respectively identified as 700, 710, and 712. The dialogues are stacked in an order in which the dialogue occurred. For example, dialogue 700 occurred first, dialogue 710 occurred second, and dialogue 712 occurred last. First dialogue 700 illustrates the user selected a clock frequency of 131 KHz. Second dialogue 710 illustrates the user selected a baud rate of 64 Kbps (bits per second). Final dialogue 712 is posted by Rule Checker given the constraints the user chose in first dialogue 700 and in second dialogue 710. The Rule Checker software program has posted the final dialogue because Rule Checker has determined that the two requested functions are in conflict.

Based on programmed knowledge of the values involved in both of the first and second dialogues and relationship between the first and second dialogues, the Rule Checker software program has determined that both criteria cannot be simultaneously met. The Rule Checker software program then informs the user of this fact. In this case, the Rule Checker software program supplies the bounds to the user. Again, please note that the action taken as a result of the conflict is but one possible action which could have been taken once the conflict was noticed.

Figures 3, 4, 5, 6, 7, 8:
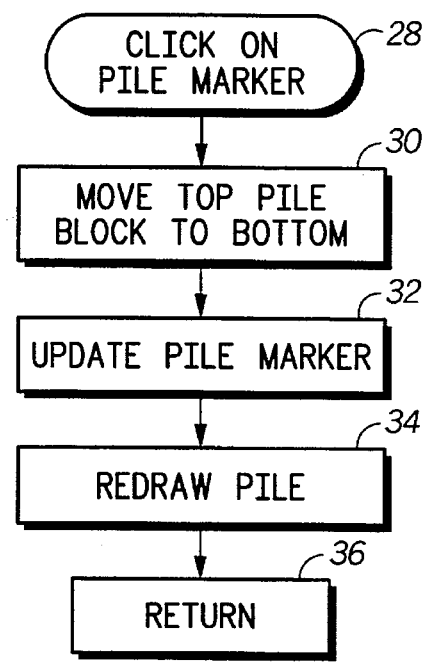
Figures 3, 4, 5, 6, 7, 8, 9:
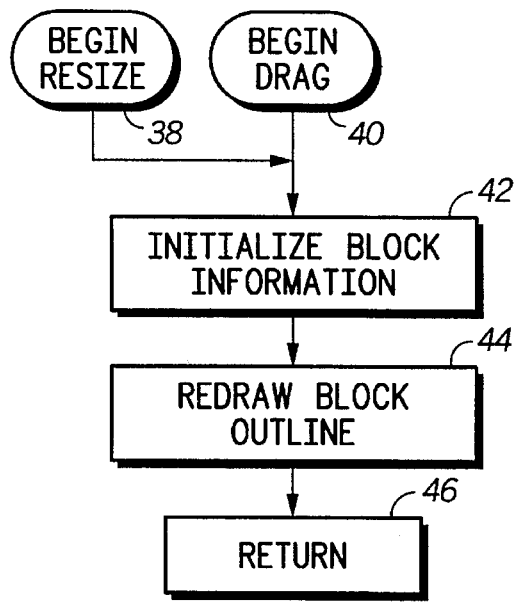
Figures 3, 4, 5, 6, 7, 8, 9, 10:
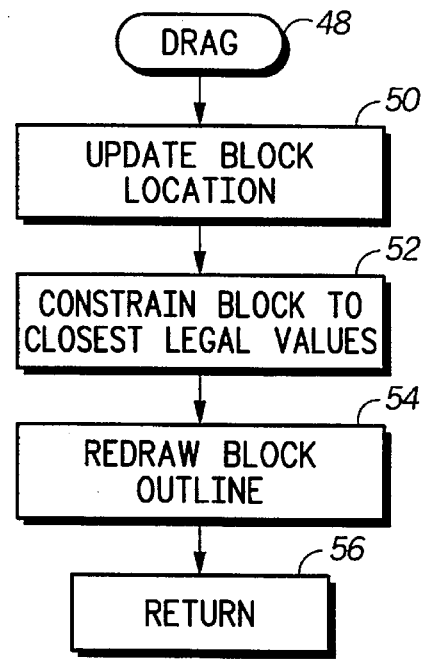
Figures 3, 4, 5, 6, 7, 8, 9, 10, 11:
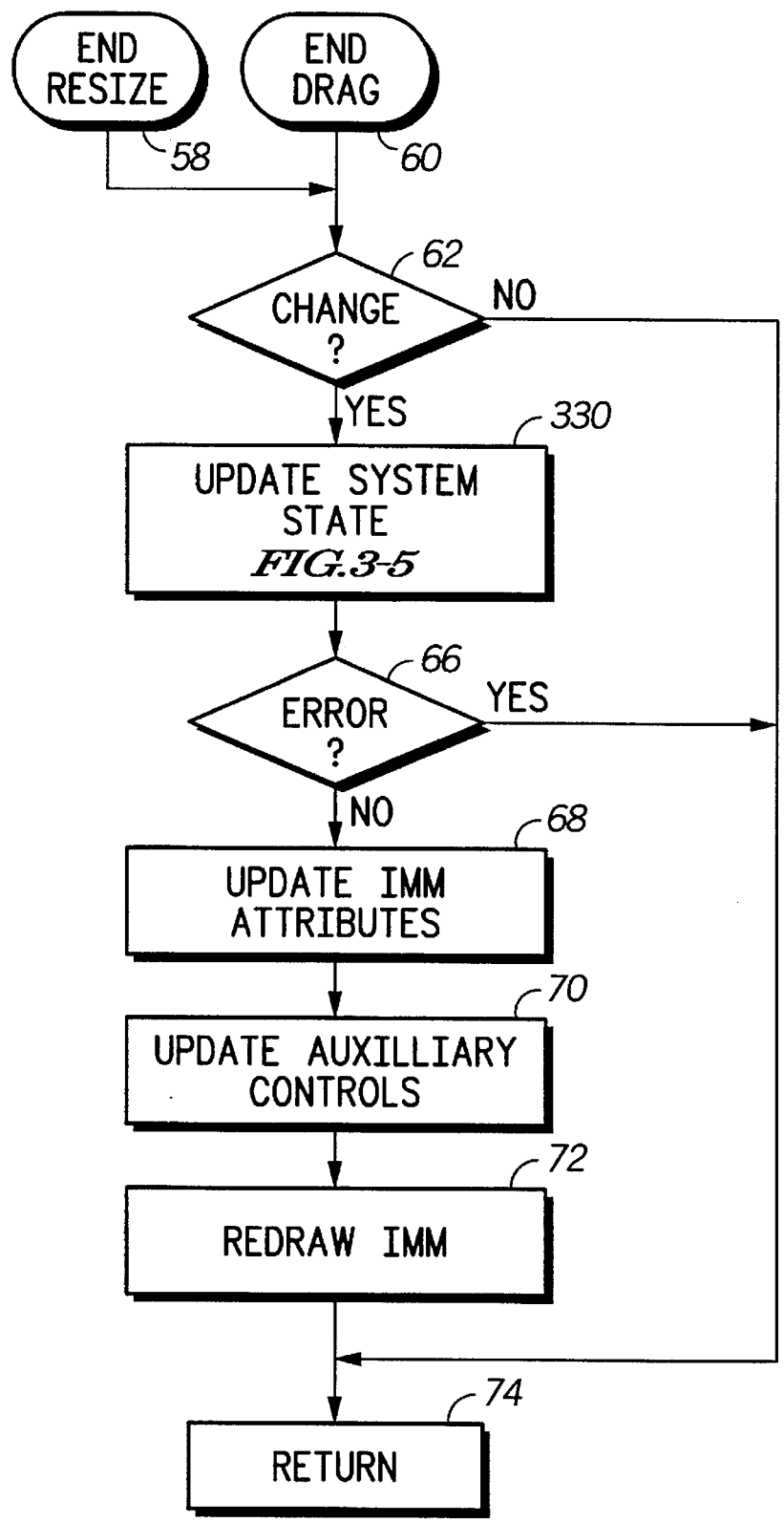
Figures 3, 4, 5, 6, 7, 8, 9, 10, 11, 12:
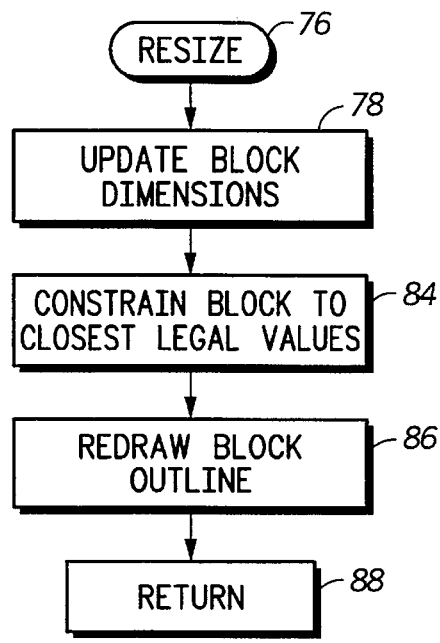
Figures 3, 4, 5, 6, 7, 8, 9, 10, 11, 12, 13:
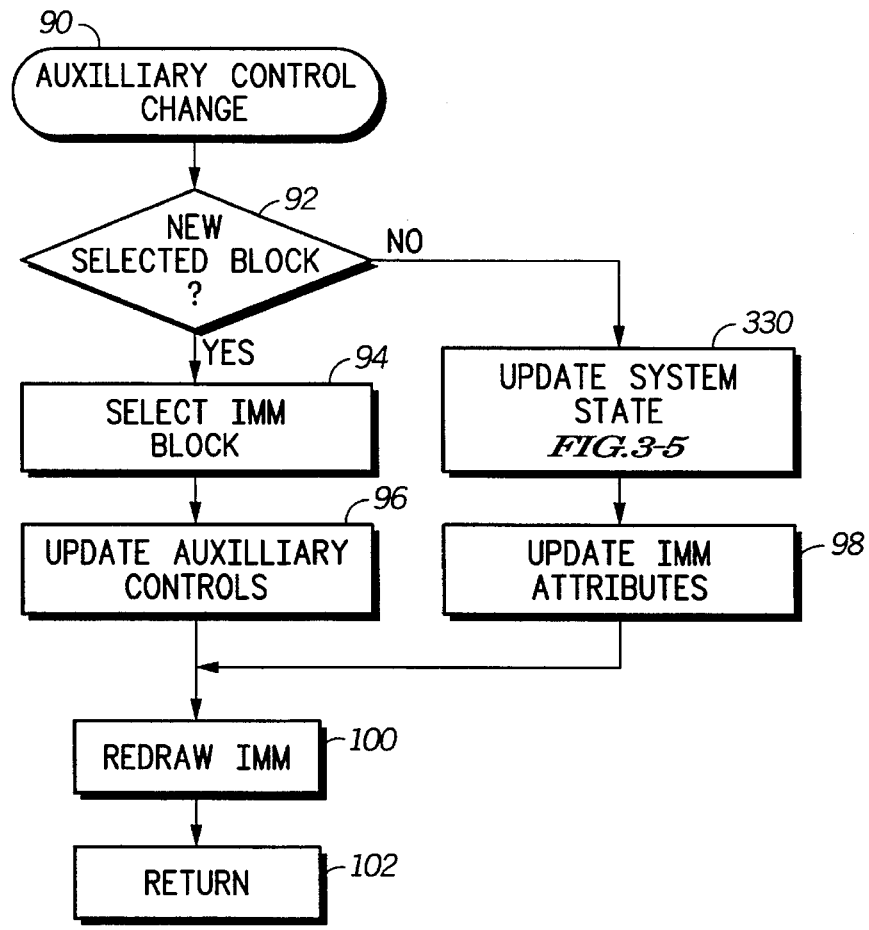
Figures 3, 4, 5, 6, 7, 8, 9, 10, 11, 12, 13, 14:
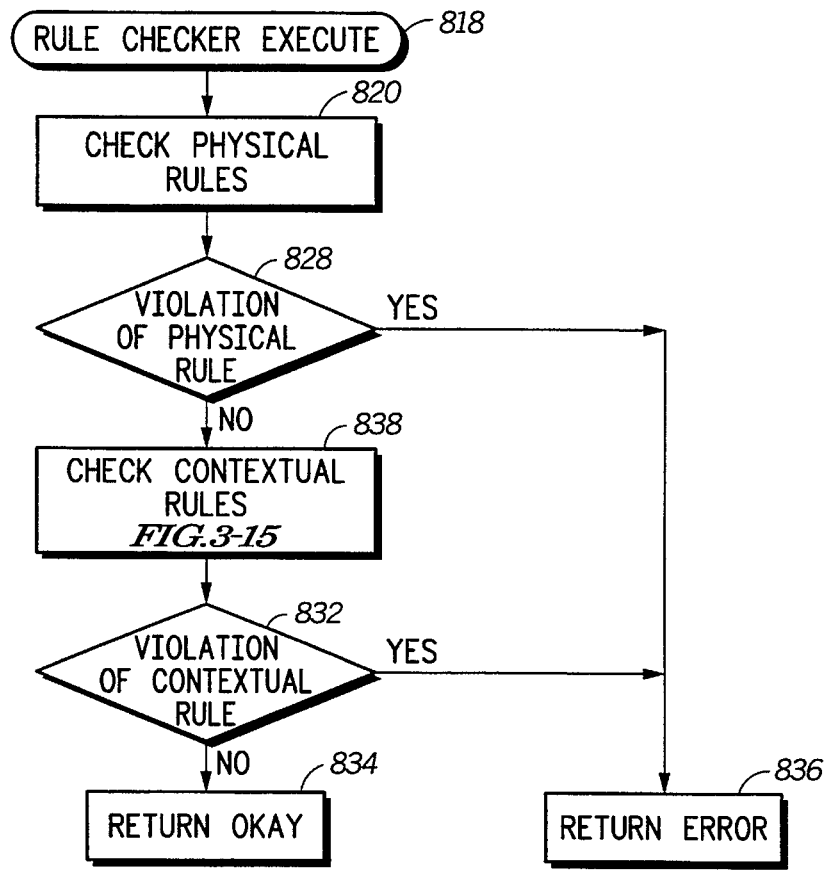
Figures 3, 4, 5, 6, 7, 8, 9, 10, 11, 12, 13, 14, 15:
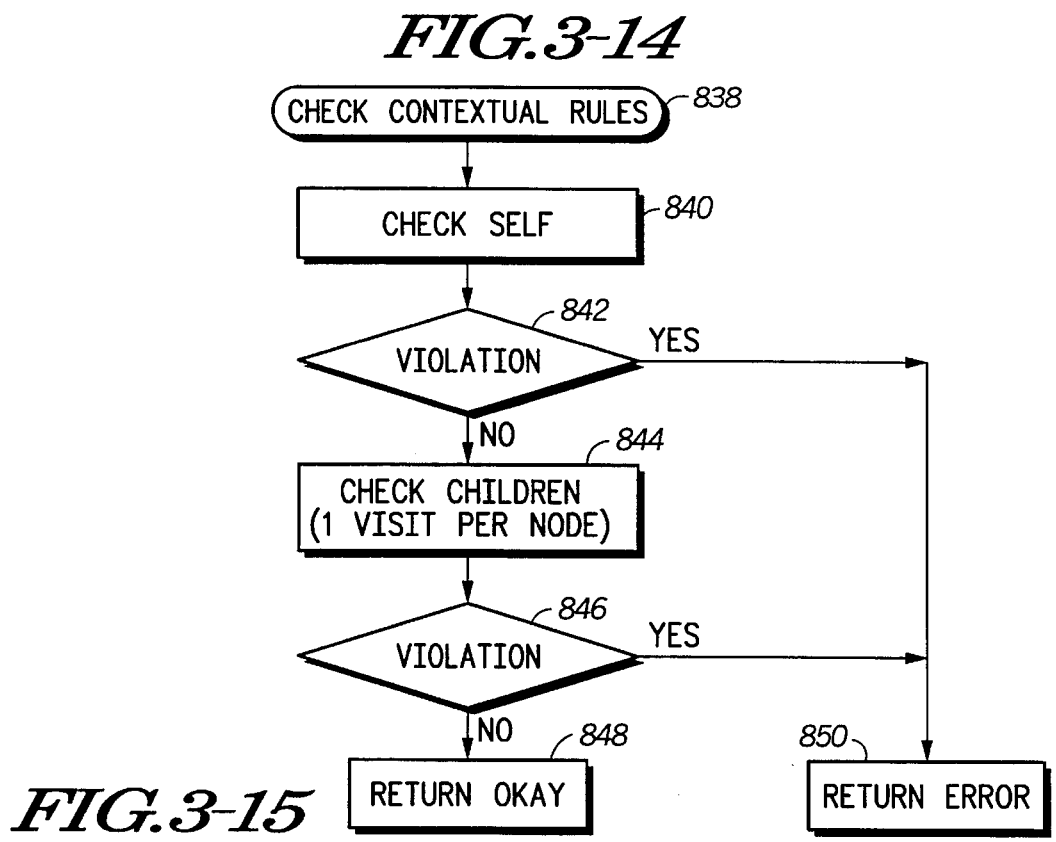
Figures 3, 4, 5, 6, 7, 8, 9, 10, 11, 12, 13, 14, 15, 16:
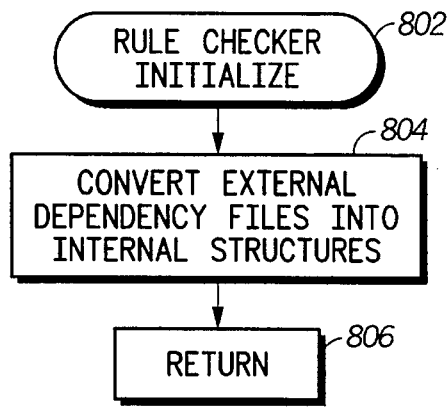
Figures 3, 4, 5, 6, 7, 8, 9, 10, 11, 12, 13, 14, 15, 16, 17:
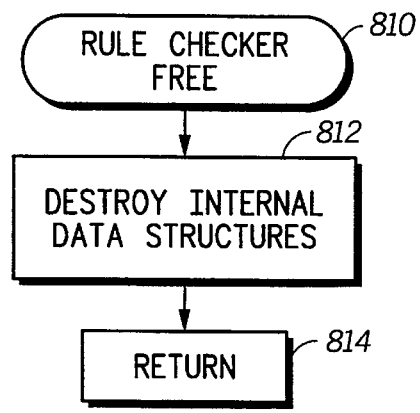
Figure 4:
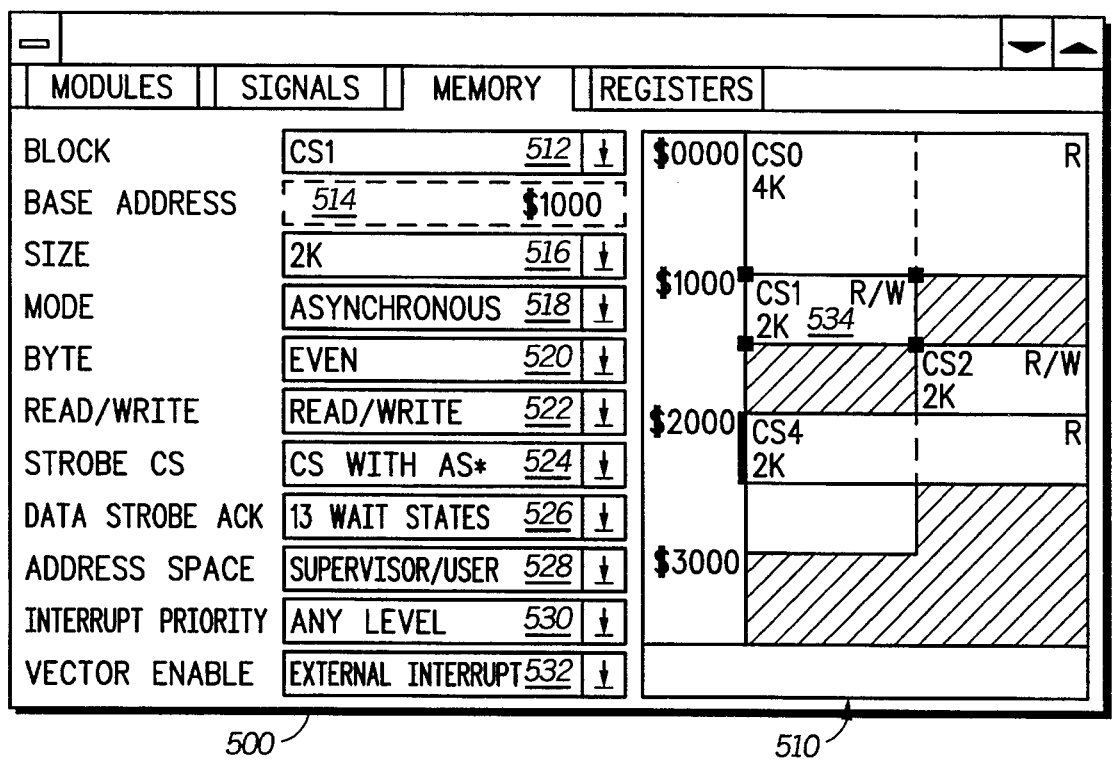
Figure 5:
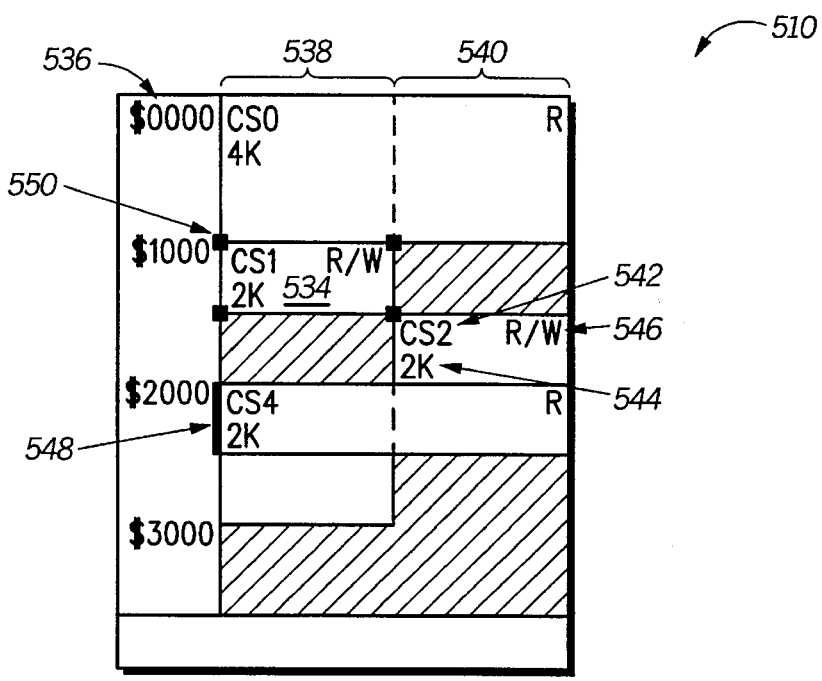
Figure 6:
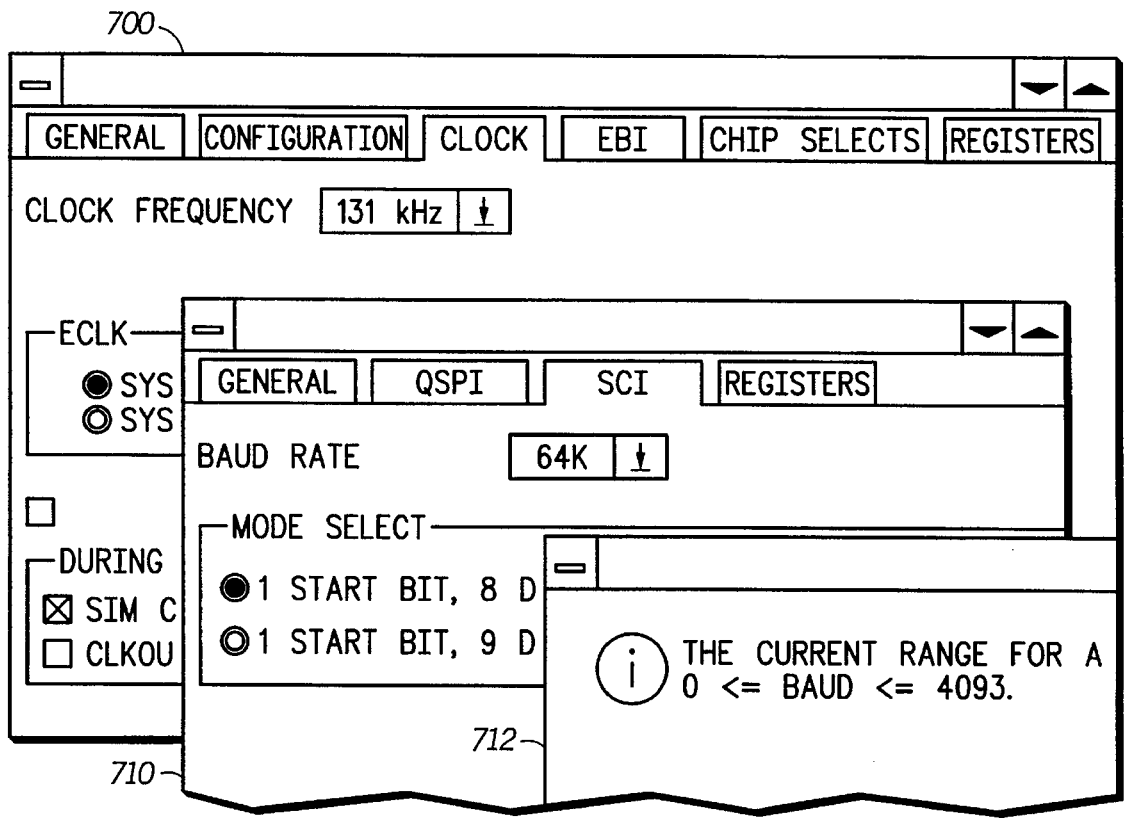
Figure 7:
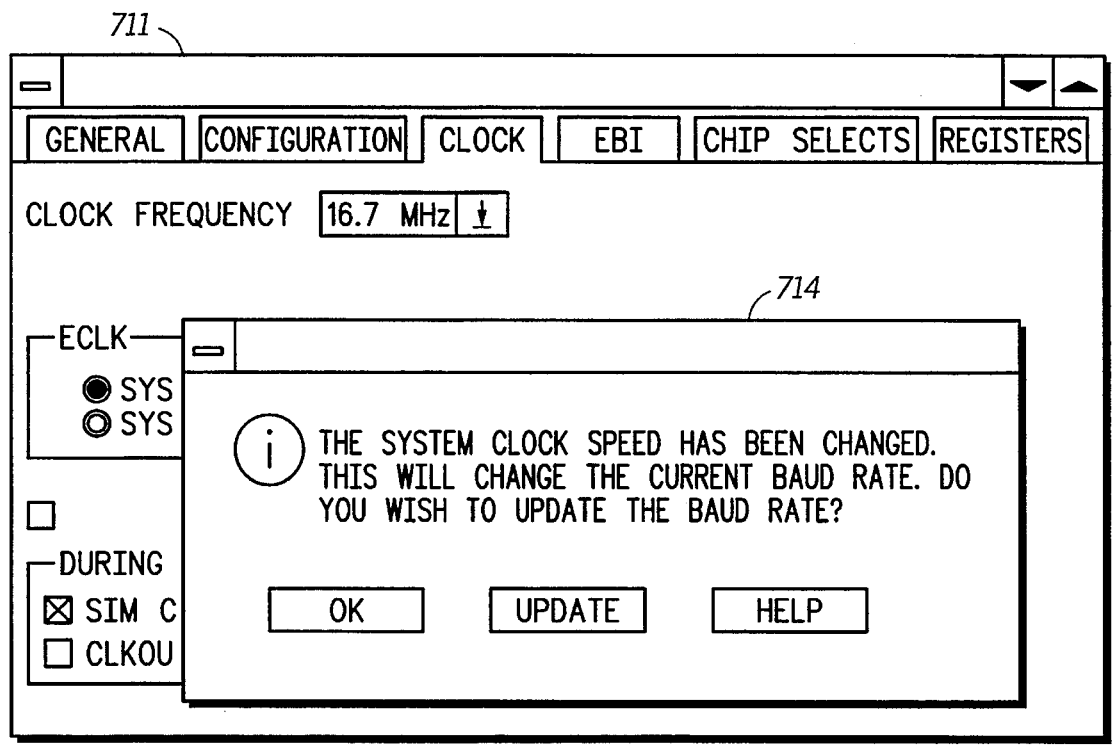
Figure 8:
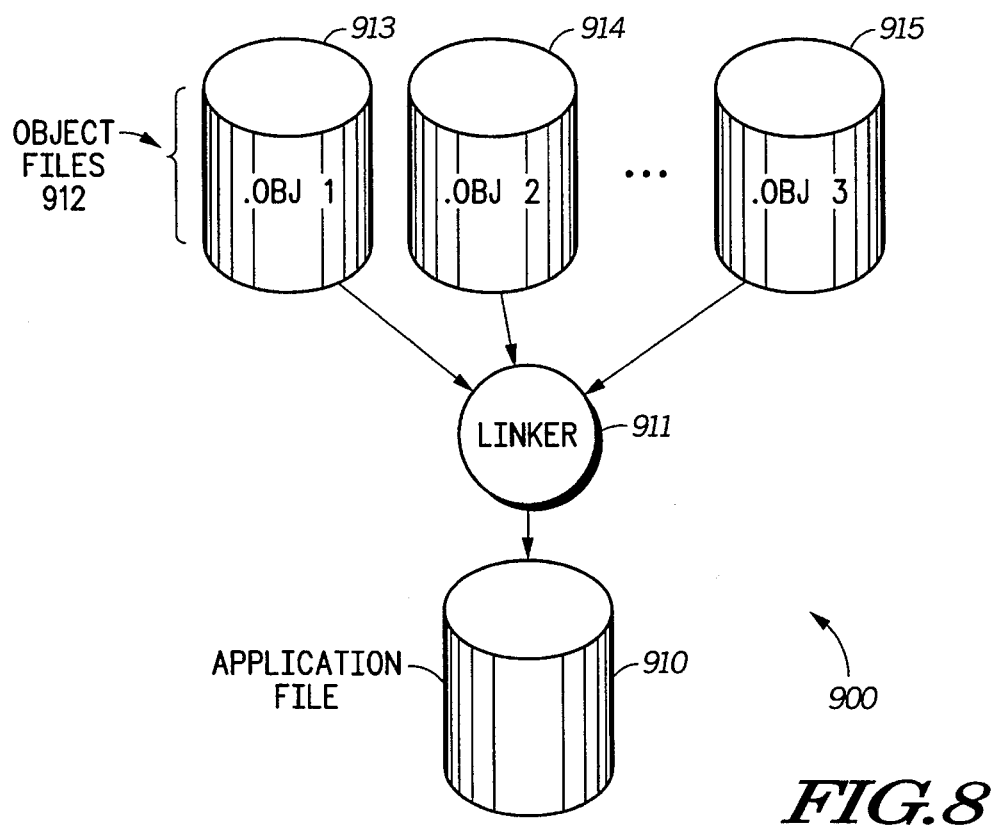

FIG. 8 illustrates two dialogues respectively identified as 711 and 714. As with dialogues 700, 710, and 720, dialogues 711 and 714 are shown in a order in which they occurred. For example, dialogue 711 occurred first and dialogue 714 occurred last. First dialogue 711 illustrates the user has chosen a clock frequency of 16.7 MHz. Second dialogue 714 illustrates a warning issued by the Rule Checker software program which indicates that a baud rate must be changed to correspond with the clock frequency chosen by the user. As a result of the modification represented in first dialogue 711, the previous baud rate will be invalid and may be corrected. Furthermore, because of the knowledge incorporated into the Rule Checker software program, the modification may include updating all the children of the parent value which was modified. Therefore, when a parent value is changed to meet a child value's requirements, all of the children's siblings must also be rechecked for conflicts.

Alternate Embodiments

The implementation of the invention described herein is provided by way of example only. However, many other implementations may exist for executing the function described herein. Both the interactive memory mapper and the Rule Checker software programs provide a product which has a variety of applications in today's software oriented workplace. The interactive memory mapper software system provides a consistent, error-preventing, intuitive interface for the memory configuration of all supported devices. Ultimately, the interactive memory mapper programming system may be provided on a variety of workstations and personal computers, due to its use of a platform-independent development product. Additionally, it should be understood that pointing device 18 may be implemented as a mouse, as a touch screen, a track-ball, a light pen, or any user interface available.

Furthermore, there are many potential applications for the Rule Checker software program. The Rule Checker software program may be used n development tools such as assemblers or compilers to help catch errors before they are coded into a program. The Rule Checker software program could also be used in conjunction with an emulator to provide aid in debugging problems. Additionally, the Rule Checker program might be developed into a stand-alone product which inspects a data processing system's source code to inspect for rule violations. The interactive memory mapper software program could also be expanded or applied in a number of ways. The interactive memory mapper software program could be expanded to support additional types of memory blocks such as memory-mapped Input/Output peripherals, stack and heap boundaries for utility libraries, interrupt vector tables, and object code modules.

An example of how the IMM and Rule Checker programs may be implemented to support object code modules is illustrated in FIG. 8. FIG. 8 illustrates a system 900 in which the IMM program may be implemented to support object code operations. System 900 includes an application file 910, a linker 911, and a plurality of object files 912, each of the plurality of object files being respectively labeled .obj1 913, .obj2 914, and .obj3 915. In an alternate embodiment of the present invention, the IMM may be extended as a "graphical linker" to support object file linker operations. Linker 911 is a software application which combines individual object files, such as .obj1 913, obj2 914, and .obj3 915, into a single application file. Linker 911 directs where code and data are placed in the target data processing system. Linker 911 also resolves references between object files and may even optimize the methods by which references are accessed in the resulting program code.

Linkers may be inflexible or difficult to learn. A simple linker might require little direction from the user, however, it probably would not be too flexible. On the other hand, a linker with a rich set of directives may enable complex operations but be difficult to master. A graphical linker may be formed by combining the IMM with new elements to provide simplified linker operation. The IMM displays the memory configuration of the target device. A secondary area displays the object files or sections of object files available for linking ("elements"). Using the keyboard or a pointing device, the user may drag elements from the secondary area over the target memory block. The element is then added to the list of sections relocated to the target memory block during the link operation. Additional displays may provide information about memory blocks, elements, and the organization of elements within memory blocks.

The graphical linker simplifies linker operation. It provides users with a more intuitive grasp of their application organization, accelerates development of directives for complex target memory configurations, and minimizes accidental placement of elements.

The interactive memory mapper software program could also be expanded to provide an interface to a data processing device's operations. For example, double-clicking on a particular memory block would open that device for editing. Additionally, if the block represents a particular module's registers, a high-level dialog for that module could appear. The interactive memory mapper software program could be applied to more general computing systems, although extensions may be necessary to provide useful features. For example, a mechanism for visually uniting clusters of memory from the same process on a UNIX system with virtual memory might be accomplished using the interactive memory mapper software. The video display of the interactive memory mapper could display the location of device drivers, executable code, interrupt service routines, TSRs (terminate and stay resident programs which are applicable to DOS and MS-DOS systems commonly used with personal computers), and other configurable groups of memory. For example, placement and compression of DOS device drivers and TSRs can be confusing, time-consuming, and obscure. Using a modified interactive memory mapper software program might enable the user to view a current configuration of a plurality of DOS device drivers and to modify the plurality of DOS device drivers manually. The Auxiliary Controls could support attributes like "keep in conventional memory" or "priority" to extend the use of the display. It should be noted that these attributes are well known in DOS systems and are used to keep a program from being corrupted.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for programming a data processing memory system, comprising the steps of:

storing a software program in a memory unit of the data processing memory system;

storing a plurality of parameters for modeling a data processor, the plurality of parameters indicating a memory organization of the data processor;

receiving a first user input for initiating the software program at an interface circuit, the interface circuit being coupled to the memory unit;

processing the first user input in a central processing unit to generate and communicate a plurality of data signals, a plurality of address signals, and a plurality of control signals to the memory circuit, the central processing unit being coupled to the interface circuit for communicating the first user input and being coupled to the memory circuit for communicating the plurality of data signals, the plurality of address signals, and the plurality of control signals;

accessing the software program in the memory unit using the plurality of data signals, the plurality of address signals, and the plurality of control signals, the software program providing a first video interface on a terminal of the data processing memory system, the first video interface illustrating a first memory organization of the data processor;

receiving a second user input for modifying a first portion of the first memory organization of the data processor; and accessing the software program in the memory circuit to determine if the second user input modifying the first portion of the first memory organization results in a first allowable memory configuration of the data processor.

2. The method of claim 1 further comprising the step of:

modifying the first video interface to illustrate a second memory organization of the data processor when the software program in the memory unit determines the second user input modifying the first portion or the first memory organization results in the first allowable memory configuration of the data processor, the first video interface remaining unchanged to illustrate the first memory organization of the data processor when the software program in the memory unit determines the second user input modifying the first portion of the first memory organization is not the first allowable memory configuration of the data processor.

3. The method of claim 1 wherein the data processor is the data processing memory system.

4. The method of claim 1 wherein one of the plurality of parameters for modeling the data processor indicates a base address of the first memory organization.

5. The method of claim 4 wherein a first chip select signal is asserted when a first one of the plurality of address signals is included in an address range defined by the base address and a size value.

6. The method of claim 1 wherein one of the plurality of parameters for modeling the data processor indicates a size of the first memory organization.

7. The method of claim 1 wherein one of the plurality of parameters for modeling the data processor indicates a bit width of the first memory organization.

8. The method of claim 1 wherein one of the plurality of parameters for modeling the data processor indicates an access right of the first memory organization.

9. The method of claim 1 wherein the first user input and the second user input are provided by one of a keyboard and a pointing device.

10. The method of claim 1 wherein the plurality of parameters are analyzed to determine if the second user input modifying the first portion of the first memory organization results in the first allowable memory configuration of the data processor.

11. The method of claim 1 further comprising the steps of:

receiving a third user input for modifying a second portion of the first memory organization of the data processor; and accessing the software program in the memory unit to determine if the third user input modifying the second portion of the first memory organization results in a second allowable memory configuration of the data processor.

12. The method of claim 11 further comprising the steps of:

modifying the first video interface to provide a second video interface which illustrates a second memory organization of the data processor when the software program in the memory unit determines the second user input modifying the first portion of the first memory organization results in the first allowable memory configuration of the data processor and the third user input modifying the second portion of the first memory organization results in the second allowable memory configuration of the data processor; and enabling the first video interface to remain unchanged and to illustrate the first memory organization of the data processor when the software program in the memory unit determines one of the second user input modifying the first portion of the first memory organization is not the first allowable memory configuration of the data processor and the third user input modifying the second portion of the first memory organization is not the second allowable memory configuration of the data processor.

13. The method of claim 12 wherein the second portion of the first memory organization is placed in front of the first portion of the first memory organization when the third user input is received.

14. The method of claim 12 wherein the first portion of the first memory organization is placed in front of the second portion of the first memory organization when the second user input is received.

15. The method of claim 1 further comprising the step of:

placing a pile marker on the first video interface to indicate the first portion of the first memory organization overlaps a second portion of the first memory organization.

16. A method for programming a data processing memory system, comprising the steps of:

storing a software program in a memory circuit of the data processing memory system;

storing a plurality of parameters for modeling a data processor, the plurality of parameters indicating a memory organization of the data processor;

receiving a first user input for initiating the software program at an interface circuit, the interface circuit being coupled to the memory circuit;

processing the first user input in a central processing unit to generate and communicate a plurality of data signals, a plurality of address signals, and a plurality of control signals to the memory circuit, the central processing unit being coupled to the interface circuit for communicating the first user input and being coupled to the memory circuit for communicating the plurality of data signals, the plurality of address signals, and the plurality of control signals;

accessing the software program in the memory unit using each of the plurality of data signals, the plurality of address signals, and the plurality of control signals, the software program providing a first video interface on a terminal of the data processing memory system, the first video interface illustrating a first memory organization and a first group of attributes of the data processor;

receiving a second user input to begin modifying the first memory organization of the data processor;

providing a second video interface of the terminal of the data processing memory system, the second video interface illustrating a second memory organization of the data processor;

receiving a third user input to end modifying the first memory organization of the data processor; and providing a third video interface of the terminal of the data processing memory system, the third video interface illustrating a third memory organization of the data processor and a second group of attributes when the third memory organization is a first allowable memory configuration.

17. The method of claim 16 wherein the third video interface illustrates the first memory organization of the data processor and the first group of attributes when the third memory organization is an unallowable memory configuration.

18. The method of claim 16 wherein a first one of the plurality of parameters for modeling the data processor indicates a base address of the first memory organization, a second one of the plurality of parameters for modeling the data processor indicates a size of the first memory organization, a third one of the plurality of parameters for modeling the data processor indicates a bit width of the first memory organization, and a fourth one of the plurality of parameters for modeling the data processor indicates an access right of the first memory organization.

19. The method of claim 18 wherein a first chip select signal is asserted when a first one of the plurality of address signals is included in an address range defined by the base address and the size.

20. The method of claim 16 wherein the first user input, the second user input, and the third user input are provided by one of a keyboard and a pointing device.

21. The method of claim 16 further comprising the steps of:

receiving a fourth user input for modifying a second portion of the first memory organization of the data processor; and accessing the software program in the memory unit to determine if the fourth user input modifying the second portion of the first memory organization results in a second allowable memory configuration of the data processor.

22. The method of claim 21 further comprising the steps of:

modifying the first video interface to provide the third video interface which illustrates the third memory organization of the data processor when the software program in the memory unit determines the third user input modifying the first portion of the first memory organization results in the first allowable memory configuration of the data processor and the fourth user input modifying the second portion of the first memory organization results in the second allowable memory configuration of the data processor; and enabling the first video interface to remain unchanged and to illustrate the first memory organization of the data processor when the software program in the memory unit determines one of the third user input modifying the first portion of the first memory organization is not the first allowable memory configuration of the data processor and the fourth user input modifying the second portion of the first memory organization is not the second allowable memory configuration of the data processor.

23. The method of claim 22 further comprising the step of:

placing a pile marker on the first video interface to indicate the first portion of the first memory organization overlaps the second portion of the first memory organization.

24. The method of claim 23 wherein the second portion of the first memory organization is placed in front of the first portion of the first memory organization on the third video interface when the fourth user input is received.

25. The method of claim 23 wherein the first portion of the first memory organization is placed in front of the second portion of the first memory organization on the fourth video interface when a sixth user input is received.

* * * * *